US008554628B1

(12) United States Patent
Morris et al.

(10) Patent No.: US 8,554,628 B1
(45) Date of Patent: Oct. 8, 2013

(54) ADVERTISEMENT DELIVERY

(75) Inventors: Harry W. Morris, Reston, VA (US); David Lowell Lippke, Bluemont, VA (US)

(73) Assignee: AOL Inc., Dulles, VA (US)

( * ) Notice: Subject to any disclaimer, the term of this patent is extended or adjusted under 35 U.S.C. 154(b) by 1384 days.

(21) Appl. No.: 09/695,844

(22) Filed: Oct. 26, 2000

Related U.S. Application Data

(60) Provisional application No. 60/161,358, filed on Oct. 26, 1999, provisional application No. 60/170,367, filed on Dec. 13, 1999.

(51) Int. Cl.
*G06Q 30/00* (2012.01)
(52) U.S. Cl.
USPC ....................................... 705/14.73
(58) Field of Classification Search
USPC ................................. 705/14, 14.73
See application file for complete search history.

(56) References Cited

U.S. PATENT DOCUMENTS

| | | |
|---|---|---|
| 5,029,104 A | 7/1991 | Dodson et al. |
| 5,105,184 A | 4/1992 | Pirani et al. |
| 5,305,195 A | 4/1994 | Murphy |
| 5,347,632 A | 9/1994 | Filepp et al. |
| 5,572,643 A | 11/1996 | Judson |
| 5,724,521 A | 3/1998 | Dedrick |
| 5,737,619 A | 4/1998 | Judson |
| 5,740,549 A | 4/1998 | Reilly et al. |
| 5,742,768 A | 4/1998 | Gennaro et al. |
| 5,754,830 A | 5/1998 | Butts et al. |
| 5,774,534 A | 6/1998 | Mayer |
| 5,781,894 A | 7/1998 | Petrecca et al. |
| 5,805,815 A | 9/1998 | Hill |
| 5,809,242 A | 9/1998 | Shaw et al. |
| 5,828,837 A | 10/1998 | Eikeland |
| 5,848,396 A | 12/1998 | Geracem |

(Continued)

FOREIGN PATENT DOCUMENTS

| | | | |
|---|---|---|---|
| WO | WO 98/21664 | * | 5/1998 |
| WO | WO 99/13423 | | 3/1999 |

OTHER PUBLICATIONS

Graham, Ian S., "The HTML Sourcebook," 1996, Wiley Computer Publishing, seconf edition, 235-241.*

(Continued)

*Primary Examiner* — Nathan C Uber
(74) *Attorney, Agent, or Firm* — Finnegan, Henderson, Farabow, Garrett & Dunner, LLP

(57) ABSTRACT

Advertisement delivery capable of providing data to satisfy advertising requests for displaying information to a user accessing an online computer system, generally includes using a first server that is structured and arranged to deliver advertisements to a first region of a display, and a second server that is structured and arranged to deliver advertisements to a second region of a display that is different from the first region. Advertisement delivery may also include a display server that sends input based on demographic data to the servers, where the display server receives instructions from at least one of the first and second servers based on the region controlled by the server, and a configuration system that generates and sends a first configuration file to the first server and a second configuration file to the second server, where the first configuration file includes instructions for displaying advertisements to the first region, and the second configuration file includes instructions for displaying advertisements to the second region.

71 Claims, 15 Drawing Sheets

(56) References Cited

U.S. PATENT DOCUMENTS

| | | | |
|---|---|---|---|
| 5,913,040 A | | 6/1999 | Rakavy et al. |
| 5,929,849 A | | 7/1999 | Kikinis |
| 5,933,811 A | | 8/1999 | Angles et al. |
| 5,937,392 A | | 8/1999 | Alberts |
| 5,946,646 A | | 8/1999 | Schena et al. |
| 5,948,061 A | | 9/1999 | Merriman et al. |
| 5,973,683 A | | 10/1999 | Cragun et al. |
| 5,991,735 A | | 11/1999 | Gerace |
| 5,999,912 A | | 12/1999 | Wodarz et al. |
| 6,009,409 A | * | 12/1999 | Adler et al. ............. 705/14 |
| 6,009,410 A | | 12/1999 | LeMole et al. |
| 6,011,537 A | | 1/2000 | Slotznick |
| 6,035,332 A | | 3/2000 | Ingrassia, Jr. et al. |
| 6,108,637 A | | 8/2000 | Blumenau |
| 6,119,098 A | | 9/2000 | Guyot et al. |
| 6,128,651 A | | 10/2000 | Cezar et al. |
| 6,133,912 A | * | 10/2000 | Montero ............. 345/327 |
| 6,138,155 A | | 10/2000 | Davis et al. |
| 6,141,010 A | * | 10/2000 | Hoyle ............. 345/356 |
| 6,167,235 A | | 12/2000 | Sibecas et al. |
| 6,177,931 B1 | * | 1/2001 | Alexander et al. ............. 345/327 |
| 6,182,050 B1 | | 1/2001 | Ballard |
| 6,185,586 B1 | | 2/2001 | Judson |
| 6,285,985 B1 | | 9/2001 | Horstmann |
| 6,299,934 B1 | | 10/2001 | Manning |
| RE37,456 E | | 11/2001 | Brisson |
| 6,314,451 B1 | | 11/2001 | Landsman et al. |
| 6,317,761 B1 | | 11/2001 | Landsman et al. |
| 6,351,736 B1 | | 2/2002 | Weisberg et al. |
| 6,457,025 B2 | | 9/2002 | Judson |
| 6,460,036 B1 | | 10/2002 | Herz |
| 6,463,468 B1 | | 10/2002 | Buch et al. |
| 6,466,967 B2 | | 10/2002 | Landsman et al. |
| 6,636,247 B1 | | 10/2003 | Hamzy et al. |
| 6,647,257 B2 | | 11/2003 | Owensby |
| 6,763,379 B1 | | 7/2004 | Shuster |
| 6,771,290 B1 | | 8/2004 | Hoyle |
| 6,799,209 B1 | | 9/2004 | Hayton |
| 6,820,277 B1 | | 11/2004 | Eldering et al. |
| 6,876,974 B1 | | 4/2005 | Marsh et al. |
| 7,103,099 B1 | | 9/2006 | Paz et al. |
| 2001/0034637 A1 | * | 10/2001 | Lin et al. ............. 705/10 |
| 2002/0010623 A1 | | 1/2002 | McCollom et al. |
| 2002/0013174 A1 | * | 1/2002 | Murata ............. 463/42 |
| 2002/0016736 A1 | | 2/2002 | Cannon et al. |
| 2002/0077130 A1 | | 6/2002 | Owensby |
| 2005/0026694 A1 | | 2/2005 | Kelly et al. |
| 2006/0036495 A1 | | 2/2006 | Aufricht et al. |
| 2007/0038728 A1 | | 2/2007 | Jacobs et al. |

OTHER PUBLICATIONS

"Computer Dictionary," 1997, Microsoft Press, third edition, p. 228.*
Definition of "advertisement", "The American Heritage Dictionary," Second College Edition, Houghton Mifflin Company, 1982, p. 82.*
New WebTV-based Internet Receiver FAQ, http://developer.webtv.net/itv/2.3-2.3.5/main.htm, pp. 1-4, Jun. 23, 1999.
New WebTV-based Internet Receiver FAQ, http://developer.webtv.net/itv/2.2.2/main.htm, pp. 1-6, Jun. 9, 1999.
Introduction to WebTV, http://developer.webtv.net/design/whydev/whydev.htm, pp. 1-2, May 13, 1999.
Interactive TV Link Checksum Tool, http://developer.webtv.net/itv/tvlink/main.htm, pp. 1-2, May 12, 1999.
Interactive TV Examples, http://developer.webtv.net/itv/examples/demo1/main.htm, pp. 1-4, Jun. 2, 1999.
Displaying TV in Web Pages, http://developer.webtv.net/itv/embedtv/main.htm, pp. 1-3, Jun. 9, 1999.
What is Interactive TV?, http://developer.webtv.net/itv/whatis/main.htm, pp. 1-5, Jun. 9, 1999.
Interactive TV Examples, http://developer.webtv.net/itv/examples/main.htm, p. 1, Jun. 9, 1999.
Interactive TV on WebTV and Windows 98, http://developer.webtv.net/itv/win98/main.htm, pp. 1-2, May 12, 1999.
Interactive TV Links, http://developer.webtv.net/itv/links/main.htm, pp. 1-7, Jun. 9, 1999.
WebTV Products, http://www.webtv.net/products/index.html, p. 1, by WebTV Networks, Inc.
WebTV—Plus, http://www.webtv.net/products/plus/index.html; pp. 1-2, by WebTV Networks, Inc.
WebTV—Plus Features, http://www.webtv.net/products/plus/wantmore.html, pp. 1-2, by WebTV Networks, Inc.
WebTV—Plus Features, http://www.webtv.net/products/plus/wantmore2.html, p. 1, by WebTV Networks, Inc.
WebTV—Plus Features, http://www.webtv.net/products/plus/wantmore3.html, p. 1, by WebTV Networks, Inc.
WebTV Classic—Features, http://www.webtv.net/products/classic/wantmore.html, p. 1, by WebTV Networks, Inc.
WebTV Classic, http://www.webtv.net/products/classic/index.html, p. 1, by WebTV Networks, Inc.
WebTV—Plus Specifications, http://www.webtv.net/products/plus/specs.html; pp. 1-2, by WebTV Networks, Inc.
Webtv—Questions and Answers, http://www.webtv.net/products/questions/index.html, pp. 1-9, by WebTV Networks, Inc.
WebTV Classic-Features, http://www.webtv.net/products/classic/wantmore2.html, pp. 1-2, by WebTV Networks, Inc.
Gallagher, K.; Parsons, J.; "A Framework for Targeting Banner Advertising on the Internet", IEEE, 1997, pp. 265-274.

* cited by examiner

ADVERTISEMENT DELIVERY

This application claims priority from U.S. Provisional Application No. 60/161,358, filed Oct. 26, 1999, which is incorporated by reference, and from U.S. Provisional Application No. 60/170,367, filed Dec. 13, 1999, which also is incorporated by reference.

TECHNICAL FIELD

This invention relates to advertisement delivery, and more particularly to coordinating delivery of advertisements being presented on an online platform.

BACKGROUND

The Internet has become an increasingly important platform for advertising. On the Internet, advertisements are typically displayed as combinations of images and text displayed in a specified region of a user's browser window. As in many other forms of mass media, the advertising host (e.g., an online service provider or web site owner) is able to derive income by enabling advertising. Advertising hosts are therefore motivated by profit to attract advertisers.

In the Internet context, advertising income is sometimes used by hosts to offset the costs associated with providing content and/or services to users, enabling those hosts to provide content and/or services for free or at a low cost to users. Low cost or free content and service may result in increased usage and corresponding increases in the circulation of the advertisements. Increased circulation makes Internet advertising increasingly effective and valuable for the advertiser.

A metric used in the advertising business is an "impression," which is defined as a single display of a given advertisement in a manner perceivable to an observer. A metric used in the online advertising business space is "screen real estate," which is the area on a web page, defined by parameters such as size and location, that may be used to display different items, such as advertisements, to create impressions. The term "ad space" is used to refer to the "screen real estate" that is devoted to advertising. A web page may include multiple ad spaces. Each ad space on each web page may be identified by a unique identifier, such as a number.

FIG. 12 illustrates an exemplary screen shot 1200 of a browser window 1202 displaying a web page containing an example of an online advertisement 1204. This particular screen shot shows a portion of the website belonging to The Washington Post. An online advertisement 1204 appears as a banner near the bottom of the screen. In the screen shot 1200 of FIG. 12, ad space data related to the advertisement 1204 may indicate that the advertisement 1204 is a relatively narrow horizontal strip that does not use the full width of the page, and/or that the advertisement 1204 appears near the bottom of the page. Other advertisements may be positioned at different locations on the screen. They may use either the entire height and width of the page, or possibly some portion of the height and the width, leaving the remainder of the screen real estate to display other advertisements or information related to the subject of the web site.

Advertisers frequently try to "target" advertisements to specific demographic groups that are likely to respond favorably to the advertisement (e.g., buy the product being advertised). Typically, a favored method of targeted marketing involves determining whether a given audience includes good candidates for a given advertisement based on demographic data, such as age, gender, profession, and income level.

Another factor typically used in deciding which advertisements should be employed is adherence to a set of advertisement presentation guidelines known as "business rules." Business rules are designed to increase the likelihood that a user will be exposed to a given advertisement at a desired frequency and in conditions that are conducive to responding to the ad. For example, business rules might be used to ensure not only a minimal exposure level but also a maximum exposure level because overexposure can be detrimental to the effectiveness of the advertisement. An example of a business rule could be the following: "Advertisement X will be displayed to a user no less than once and no more than three times in any 24-hour period."

"Ad inventory" is a set of advertisements available for a given ad space. For example, if a specific ad space is located on a web page discussing personal computer devices, then advertisers for computer equipment, consumer electronics devices, and long-distance telephone service might all provide a set of advertisements to be displayed to this audience. Thus, in this example, the ad inventory on a personal computing web page might includes at least three different types of advertisements from three separate advertisers.

The objective of the advertiser is to maximize the exposure of the product or service being advertised to the desired audiences, given the cost constraints of the advertiser's budget (i.e., how much the advertiser can afford to pay to the advertising host in return for displaying the advertisements). Toward this end, the advertiser often will provide requirements to the advertising host. For example, an advertiser may require that an advertisement be displayed only at specific times of day, or only at specific positions on the computer screens of the users. The advertiser also may require that its advertisements be displayed a minimum number of times within a defined time period, thus generating a desired number of impressions. Typically, an advertiser purchases a specific number of impressions, for example, in quantities of one thousand, so that their advertisement is displayed in a specific ad space that number of times over a given time period.

There are several criteria pertaining to advertising that affect the price of advertisement (i.e., how much revenue is generated by the advertising host in return for its display of a given advertisement) and the satisfaction of the client. These may include: 1) the size of the advertisement; 2) the placement of the advertisement within the screen; 3) the number of times the advertisement is displayed; and 4) the time(s) of day that the advertisement is displayed. These criteria must be taken into account by the advertising host.

Advertising hosts have used both demographic data and business rules to help make their services and/or sites attractive to advertisers. This is primarily accomplished through the use of relational databases that store demographic data and advertising usage statistics. Advertising hosts typically use software to run various algorithms and queries to determine which advertisements should be displayed based on the demographic data and advertising usage statistics stored in the databases.

Historically, it has been necessary to continuously update the basic technology used to drive a relational database to account for increases in database size, a necessary incident to increases in the usage of online services and the Internet. Furthermore, the sheer size of the databases has made their use cumbersome and inefficient.

More recent systems for coordinating advertisement configurations and business rules for advertising purposes have generally used large relational databases that are accessed by servers, hereinafter referred to as ad display servers. A typical procedure entails the compilation of a large data file called a configuration file, which is uploaded into the ad display server on a periodic basis (perhaps daily). This file contains all the pertinent information needed for delivery of advertisements for the next period (i.e., until a new configuration file would be generated and uploaded). This information typically includes all of the new advertisements (any advertisements which previously had been displayed would already be present within the relational database), configuration information needed to display the advertisement in the correct ad space, statistical data from the previous period impacting the application of the business rules (e.g., how many times was some specific impression shown the previous day), and updates to demographic data (e.g., data about new subscribers).

SUMMARY

In one aspect, generally, advertisement delivery capable of providing data to satisfy advertising requests for displaying information to a user accessing an online computer system, includes using a first server that is structured and arranged to deliver advertisements to a first region of a display, and a second server that is structured and arranged to deliver advertisements to a second region of the display, that differs from the first region.

Implementations may include one or more of the following features. For example, the first region of the display and the second region of the display may overlap. Alternatively, the first region of the display and the second region of the display may be mutually exclusive.

The first server may receive a first configuration file that includes instructions for displaying advertisements within the first region and the second server may receive a second configuration file that includes instructions for displaying advertisements within the second region, where the first configuration file may be the same as or may be different from the second configuration file.

Advertisement delivery may also include a display server that sends information having associated demographic data to the first server, where the first server determines which of several available advertisements to display in the first region based on the demographic data. Generally, the display server receives instructions from the first server based on the demographic data.

Advertisement delivery may also include a configuration system that generates a first configuration file that includes instructions for directing the first server to display advertisements within the first region, and a second configuration file that includes instructions directing the second server to display advertisements within the second region, where the second configuration file may be the same as or may be different from the first configuration file.

The first server may be structured and arranged to deliver advertisements only to the first region of the display, and the second server may be structured and arranged to deliver advertisements only to the second region of the display. The configuration system may generate a first configuration file that only includes instructions for directing the first server to display advertisements within the first region, and a second configuration file that only includes instructions for directing the second server to display advertisements within the second region. Typically, the configuration system generates the first and second configuration files based on output received from the first and second servers, and updates preexisting configuration files resident on the first and second servers with the first and second configuration files, respectively.

Advertisement delivery may further include a demographics server that extracts from an electronic data store demographic data corresponding to the user of the online computer system and that enables generation of display to the user based on the demographic data extracted.

These general and specific aspects may be implemented using a system or method or combination of system and method.

Aspects of advertisement delivery described above may be beneficial in addressing at least three difficulties with current advertisement delivery. The first two difficulties result from the increasingly large number of online service subscribers, namely 1) a relatively large number of ad display servers are required, and 2) an extremely large size is typically required for each configuration file. While the number of online service subscribers and hence the number of ad display servers is relatively small, the coordination of demographic data and business rules can be coordinated with relative ease. However, the complexity of coordination increases exponentially as the number of online service subscribers and ad display servers increases. Furthermore, with an increase in the amount of online content available, the size of each configuration file also increases. An increase in the size of each configuration file results in increased communication burdens on ad display servers, leading to a compromise in the availability of the ad display servers to provide advertising. This problem may be exacerbated when the servers are independent such that the entire configuration file is uploaded to each server, rendering the ad display servers unavailable for increasingly long periods of time as the configuration file sizes are increased. As a consequence of the resulting ad display server unavailability, potential revenues for the online service provider are lost and the user's experience is degraded.

A third difficulty results from the need for periodic updates to the configuration files of independent ad display servers. Because the servers are independent of one another, the overall system cannot react instantaneously to problems which occur, some of which require a quick remedy in order to deliver properly the advertisements. Rather, the overall system must wait until the updated configuration file is uploaded. This tends to impact revenues directly.

Other features and advantages will be apparent from the following description, including the drawings, and from the claims.

BRIEF DESCRIPTION OF THE DRAWINGS

Like reference numbers and designations in the various drawings may indicate like elements.

DESCRIPTION OF THE PREFERRED EMBODIMENTS

For illustrative purposes, FIGS. 1-6 describe a communications system for implementing techniques for transferring files between subscribers of a host complex. For brevity, several elements in the figures described below are represented as monolithic entities. However, as would be understood by one skilled in the art, these elements each may include numerous interconnected computers and components designed to perform a set of specified operations and/or dedicated to a particular geographical region.

Figure 1:
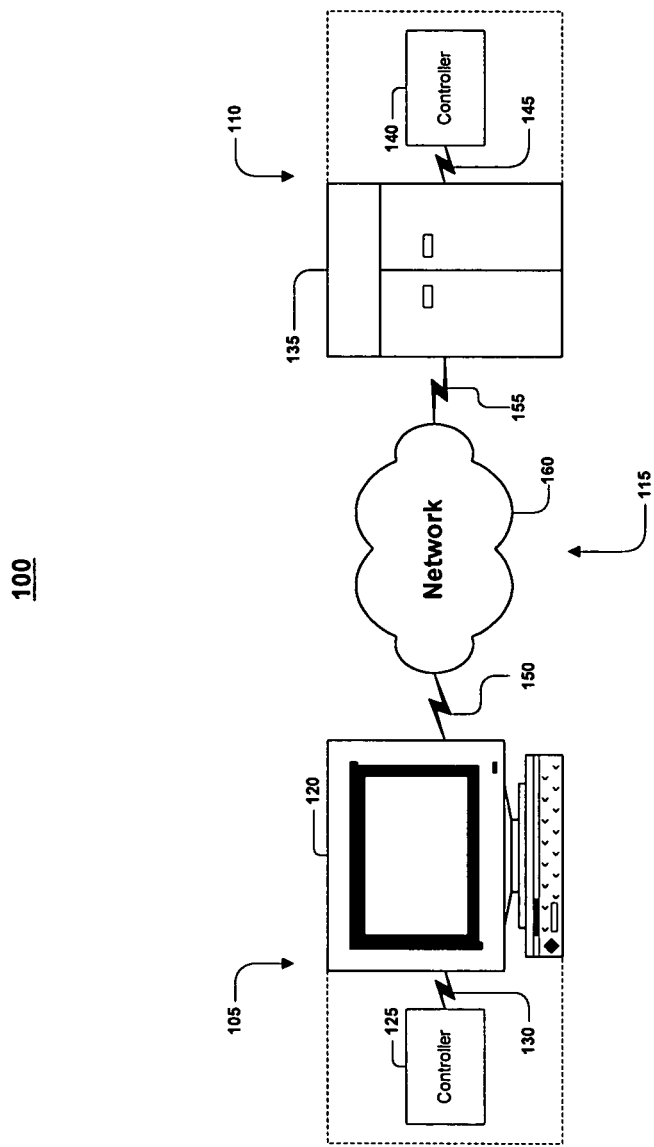
FIG. 1 is a block diagram of a communications system.

Referring to FIG. 1, a communications system 100 is capable of delivering and exchanging data between a client system 105 and a host system 110 through a communications link 115. The client system 105 typically includes one or more client devices 120 and/or client controllers 125, and the host system 110 typically includes one or more host devices 135 and/or host controllers 140. For example, the client system 105 or the host system 110 may include one or more general-purpose computers (e.g., personal computers), one or more special-purpose computers (e.g., devices specifically programmed to communicate with each other and/or the client system 105 or the host system 110), or a combination of one or more general-purpose computers and one or more special-purpose computers. The client system 105 and the host system 110 may be arranged to operate within or in concert with one or more other systems, such as, for example, one or more LANs ("Local Area Networks") and/or one or more WANs ("Wide Area Networks").

The client device 120 (or the host controller 135) is generally capable of executing instructions under the command of a client controller 125 (or a host controller 140). The client device 120 (or the host device 135) is connected to the client controller 125 (or the host controller 140) by a wired or wireless data pathway 130 or 145 capable of delivering data.

The client device 120, the client controller 125, the host device 135, and the host controller 140 each typically includes one or more hardware components and/or software components. An example of a client device 120 or a host device 135 is a general-purpose computer (e.g., a personal computer) capable of responding to and executing instructions in a defined manner. Other examples include a special-purpose computer, a workstation, a server, a device, a component, other physical or virtual equipment or some combination thereof capable of responding to and executing instructions.

An example of client controller 125 or a host controller 140 is a software application loaded on the client device 120 or the host device 135 for commanding and directing communications enabled by the client device 120 or the host device 135. Other examples include a program, a piece of code, an instruction, a device, a computer, a computer system, or a combination thereof, for independently or collectively instructing the client device 120 or the host device 135 to interact and operate as described. The client controller 125 and the host controller 140 may be embodied permanently or temporarily in any type of machine, component, physical or virtual equipment, storage medium, or propagated signal capable of providing instructions to the client device 120 or the host device 135.

The communications link 115 typically includes a delivery network 160 making a direct or indirect communication between the client system 105 and the host system 110, irrespective of physical separation. Examples of a delivery network 160 include the Internet, the World Wide Web, WANs, LANs, analog or digital wired and wireless telephone networks (e.g. PSTN, ISDN, and xDSL), radio, television, cable, satellite, and/or any other delivery mechanism for carrying data. The communications link 115 may include communication pathways 150, 155 that enable communications through the one or more delivery networks 160 described above. Each of the communication pathways 150, 155 may include, for example, a wired, wireless, cable or satellite communication pathway.

Figure 2:
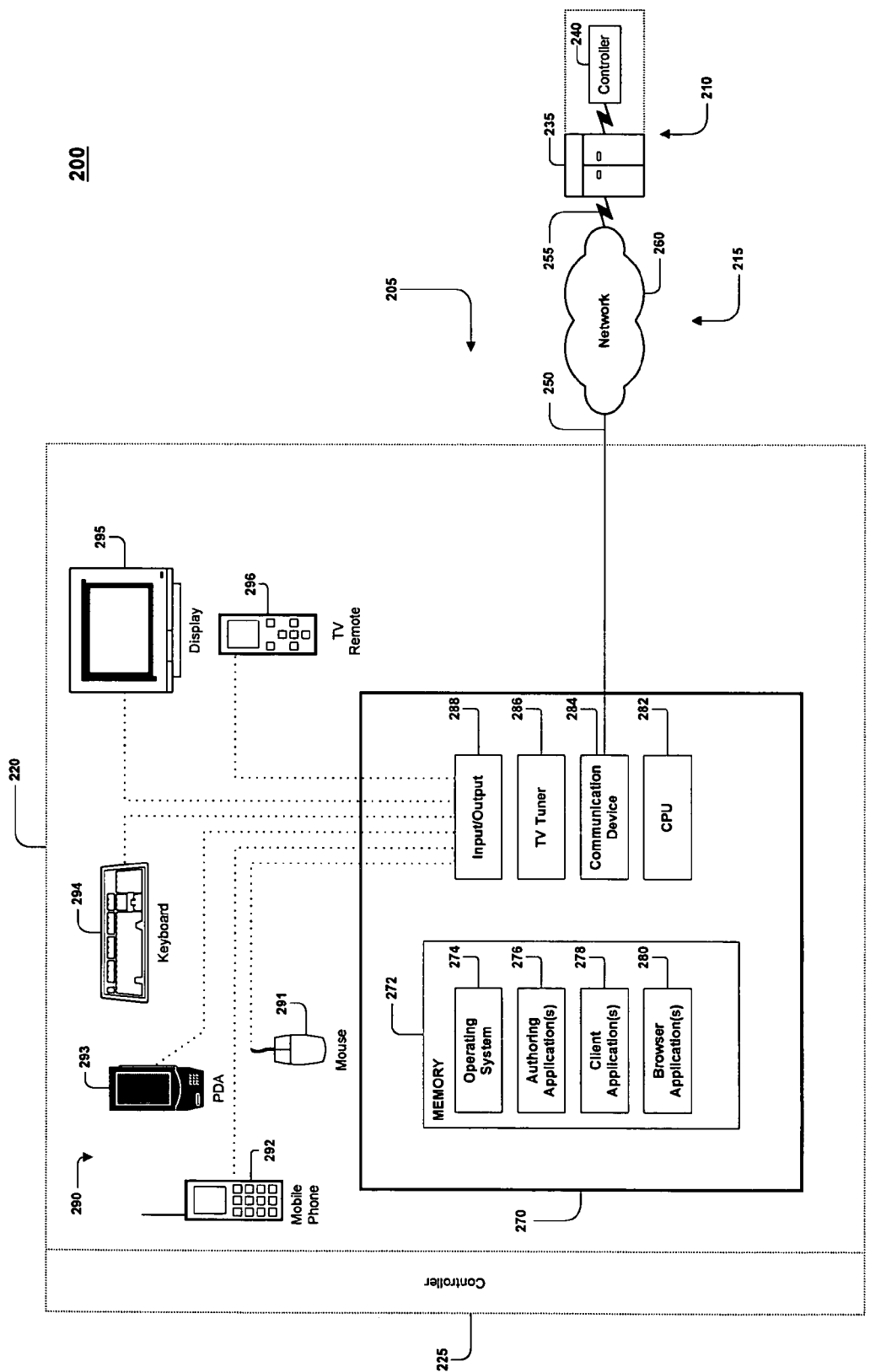
FIGS. 2-6 are expansions of the block diagram of FIG. 1.

FIG. 2 illustrates a communication system 200 including a client system 205 communicating with a host system 210 through a communications link 215. Client system 205 typically includes one or more client devices 220 and one or more client controllers 225 for controlling the client devices 220. Host system 210 typically includes one or more host devices 235 and one or more host controllers 240 for controlling the host devices 235. The communications link 215 may include communication pathways 250, 255 enabling communications through the one or more delivery networks 260.

Examples of each element within the communication system of FIG. 2 are broadly described above with respect to FIG. 1. In particular, the host system 210 and the communications link 215 typically have attributes comparable to those described with respect to the host system 110 and the communications link 115 of FIG. 1, respectively. Likewise, the client system 205 of FIG. 2 typically has attributes comparable to and may illustrate one possible embodiment of the client system 105 of FIG. 1.

The client device 220 typically includes a general purpose computer 270 having an internal or external storage 272 for storing data and programs such as an operating system 274 (e.g., DOS, Windows™, Windows 95™, Windows 98™, Windows 2000™, Windows NT™, OS/2, and Linux) and one or more application programs. Examples of application programs include authoring applications 276 (e.g., word processing, database programs, spreadsheet programs, and graphics programs) capable of generating documents or other electronic content; client applications 278 (e.g., AOL client, CompuServe client, AIM client, AOL TV client, and ISP client) capable of communicating with other computer users, accessing various computer resources, and viewing, creating, or otherwise manipulating electronic content; and browser applications 280 (e.g., Netscape's Navigator and Microsoft's Internet Explorer) capable of rendering standard Internet content.

The general-purpose computer 270 also includes a central processing unit 282 (CPU) for executing instructions in response to commands from the client controller 225. In one implementation, the client controller 225 includes one or more of the application programs installed on the internal or external storage 272 of the general-purpose computer 270. In another implementation, the client controller 225 includes application programs externally stored in and executed by one or more device(s) external to the general-purpose computer 270.

The general-purpose computer typically will include a communication device 284 for sending and receiving data. One example of the communication device 284 is a modem. Other examples include a transceiver, a set-top box, a communication card, a satellite dish, an antenna, or another network adapter capable of transmitting and receiving data over the communications link 215 through a wired or wireless data pathway 250. The general-purpose computer 270 also may include a TV ("television") tuner 286 for receiving television programming in the form of broadcast, satellite, and/or cable TV signals. As a result, the client device 220 can selectively and/or simultaneously display network content received by communications device 284 and television programming content received by the TV tuner 286.

The general-purpose computer 270 typically will include an input/output interface 288 to enable a wired or wireless connection to various peripheral devices 290. Examples of peripheral devices 290 include, but are not limited to, a mouse 291, a mobile phone 292, a personal digital assistant 293 (PDA), a keyboard 294, a display monitor 295 with or without a touch screen input, and/or a TV remote control 296 for receiving information from and rendering information to subscribers. Other examples may include voice recognition and synthesis devices.

Although FIG. 2 illustrates devices such as a mobile telephone 292, a PDA 293, and a TV remote control 296 as being peripheral to the general-purpose computer 270, in another implementation, such devices may themselves include the functionality of the general-purpose computer 270 and operate as the client device 220. For example, the mobile phone 292 or the PDA 293 may include computing and networking capabilities, and may function as a client device 220 by accessing the delivery network 260 and communicating with the host system 210. Furthermore, the client system 205 may include one, some or all of the components and devices described above.

Figure 3:
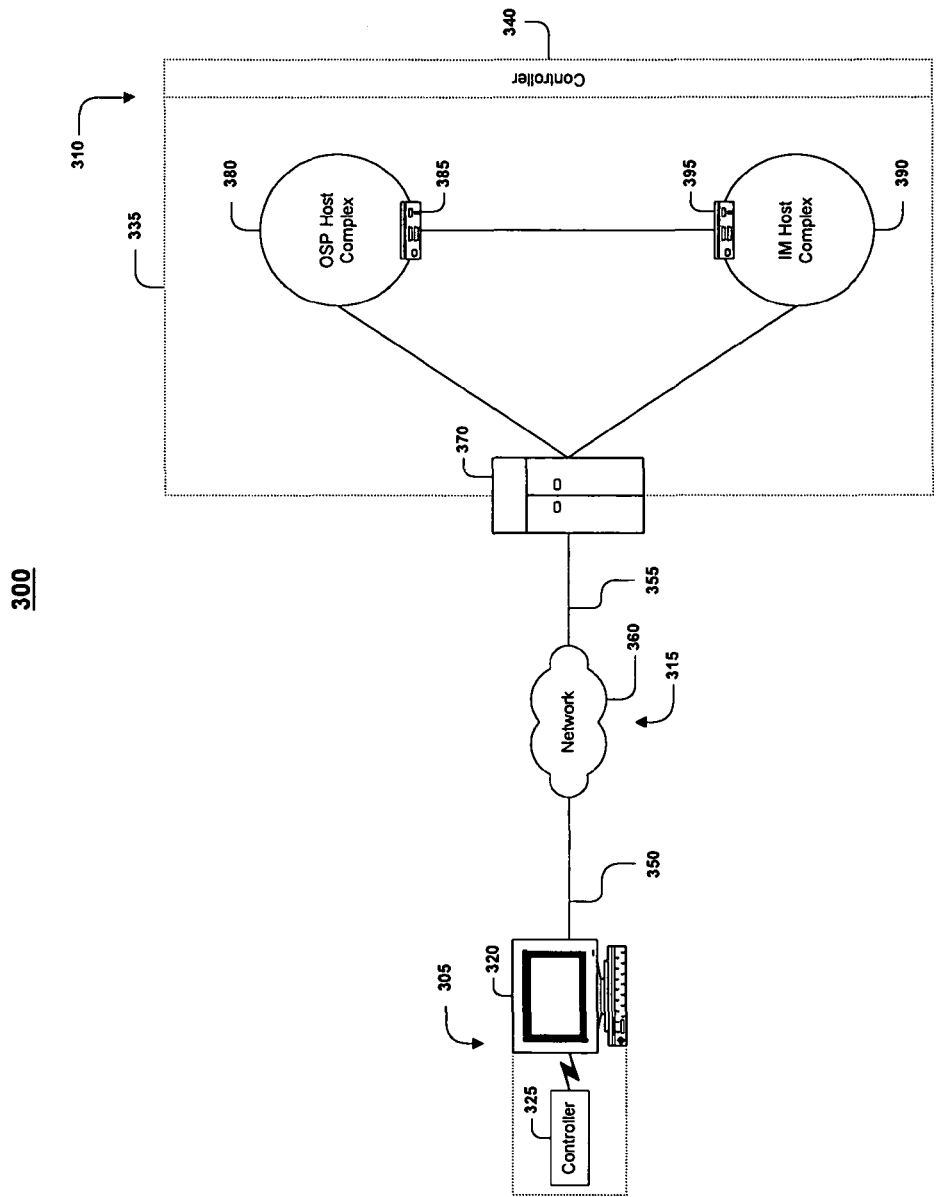

Referring to FIG. 3, a communications system 300 is capable of delivering and exchanging information between a client system 305 and a host system 310 through a communication link 315. Client system 305 typically includes one or more client devices 320 and one or more client controllers 325 for controlling the client devices 320. Host system 310 typically includes one or more host devices 335 and one or more host controllers 340 for controlling the host devices 335. The communications link 315 may include communication pathways 350, 355 enabling communications through the one or more delivery networks 360.

Examples of each element within the communication system of FIG. 3 are broadly described above with respect to FIGS. 1 and 2. In particular, the client system 305 and the communications link 315 typically have attributes comparable to those described with respect to client systems 105 and 205 and communications links 115 and 215 of FIGS. 1 and 2. Likewise, the host system 310 of FIG. 3 may have attributes comparable to and may illustrate one possible embodiment of the host systems 110 and 210 shown in FIGS. 1 and 2.

The host system 310 includes a host device 335 and a host controller 340. The host controller 340 is generally capable of transmitting instructions to any or all of the elements of the host device 335. For example, in one implementation, the host controller 340 includes one or more software applications loaded on the host device 335. However, in other implementations, as described above, the host controller 340 may include any of several other programs, machines, and devices operating independently or collectively to control the host device 335.

The host device 335 includes a login server 370 for enabling access by subscribers and routing communications between the client system 305 and other elements of the host device 335. The host device 335 also includes various host complexes such as the depicted OSP ("Online Service Provider") host complex 380 and IM ("Instant Messaging") host complex 390. To enable access to these host complexes by subscribers, the client system 305 may include communication software, for example, an OSP client application and an IM client application. The OSP and IM communication software applications are designed to facilitate the subscriber's interactions with the respective services and, in particular, may provide access to all the services available within the respective host complexes. For example, Instant Messaging allows a subscriber to use the IM client application to view whether particular subscribers ("buddies") are online, exchange instant messages with particular subscribers, participate in group chat rooms, trade files such as pictures, invitations or documents, find other subscribers with similar interests, get customized news and stock quotes, and search the Web.

Typically, the OSP host complex 380 supports different services, such as email, discussion groups, chat, news services, and Internet access. The OSP host complex 380 is generally designed with an architecture that enables the machines within the OSP host complex 380 to communicate with each other, certain protocols (i.e., standards, formats, conventions, rules, and structures) being employed to enable the transfer of data. The OSP host complex 380 ordinarily employs one or more OSP protocols and custom dialing engines to enable access by selected client applications. The OSP host complex 380 may define one or more specific protocols for each service based on a common, underlying proprietary protocol.

The IM host complex 390 is generally independent of the OSP host complex 380, and supports instant messaging services irrespective of a subscriber's network or Internet access. Thus, the IM host complex 390 allows subscribers to send and receive instant messages, whether or not they have access to any particular ISP. The IM host complex 390 may support associated services, such as administrative matters, advertising, directory services, chat, and interest groups related to the instant messaging. The IM host complex 390 has an architecture that enables all of the machines within the IM host complex to communicate with each other. To transfer data, the IM host complex 390 employs one or more standard or exclusive IM protocols.

The host device 335 may include one or more gateways that connect and therefore link complexes, such as the OSP host complex gateway 385 and the IM host complex gateway 395. The OSP host complex gateway 385 and the IM host complex 395 gateway may directly or indirectly link the OSP host complex 380 with the IM host complex 390 through a wired or wireless pathway. Ordinarily, when used to facilitate a link between complexes, the OSP host complex gateway 385 and the IM host complex gateway 395 are privy to information regarding a protocol anticipated by a destination complex, which enables any necessary protocol conversion to be performed incident to the transfer of data from one complex to another. For instance, the OSP host complex 380 and IM host complex 390 may use different protocols such that transferring data between the complexes requires protocol conversion by or at the request of the OSP host complex gateway 385 and/or the IM host complex gateway 395.

Figure 4:
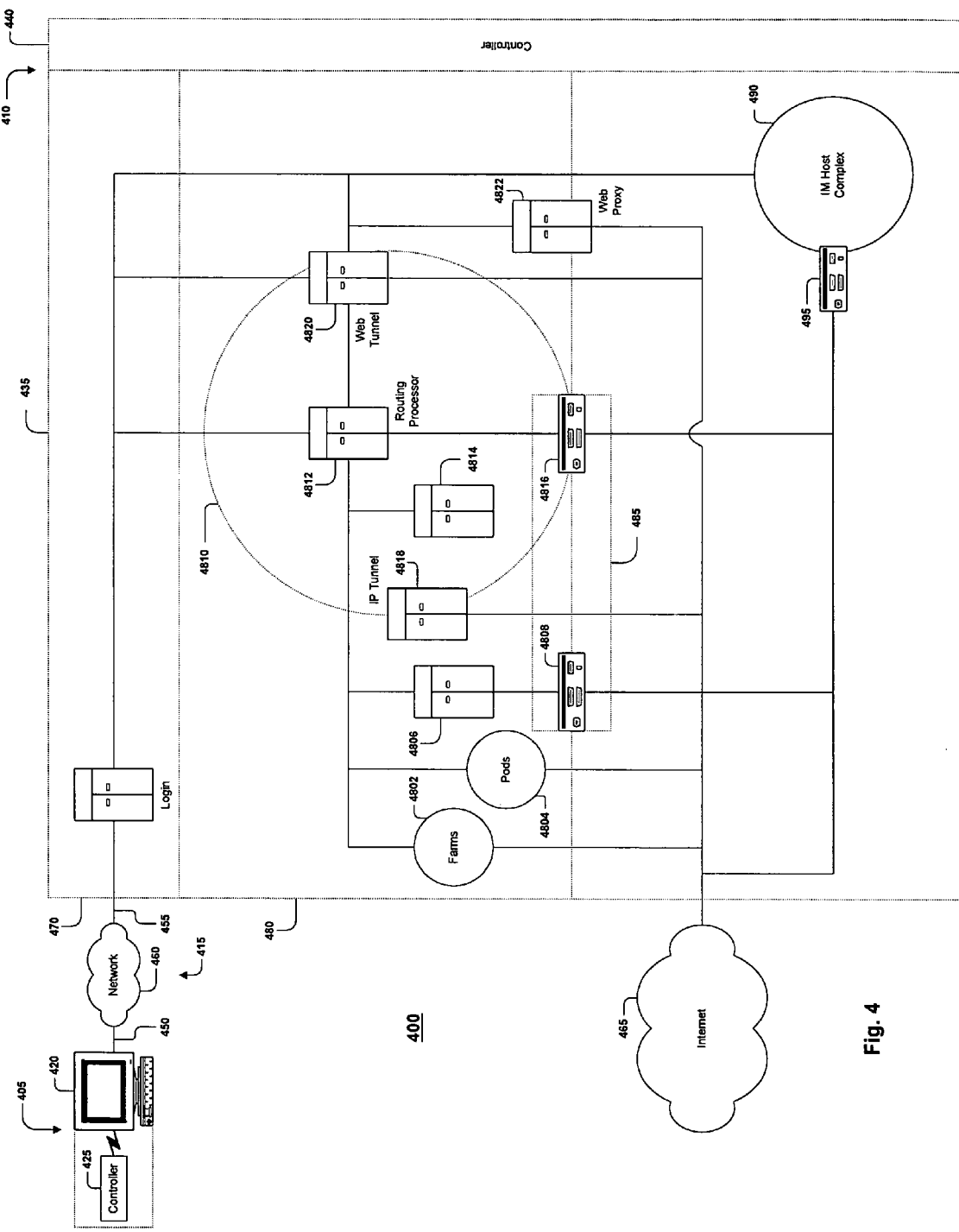

Referring to FIG. 4, a communications system 400 is capable of delivering and exchanging information between a client system 405 and a host system 410 through a communication link 415. Client system 405 typically includes one or more client devices 420 and one or more client controllers 425 for controlling the client devices 420. Host system 410 typically includes one or more host devices 435 and one or more host controllers 440 for controlling the host devices 435. The communications link 415 may include communication pathways 450, 455 enabling communications through the one or more delivery networks 460. As shown, the client system 405 may access the Internet 465 through the host system 410.

Examples of each element within the communication system of FIG. 4 are broadly described above with respect to FIGS. 1-3. In particular, the client system 405 and the communications link 415 typically have attributes comparable to those described with respect to client systems 105, 205, and 305 and communications links 115, 215, and 315 of FIGS. 1-3. Likewise, the host system 410 of FIG. 4 may have attributes comparable to and may illustrate one possible embodiment of the host systems 110, 210, and 310 shown in FIGS. 1-3. FIG. 4 describes an aspect of the host system 410, focusing primarily on one particular implementation of OSP host complex 480.

The client system 405 includes a client device 420 and a client controller 425. The client controller 425 is generally capable of establishing a connection to the host system 410, including the OSP host complex 480, the IM host complex 490 and/or the Internet 465. In one implementation, the client controller 425 includes an OSP application for communicating with servers in the OSP host complex 480 using OSP protocols that may or may not be exclusive or proprietary. The client controller 425 also may include applications, such as an IM client application and/or an Internet browser application, for communicating with the IM host complex 490 and the Internet 465.

The host system 410 includes a host device 435 and a host controller 440. The host controller 440 is generally capable of transmitting instructions to any or all of the elements of the host device 435. For example, in one implementation, the host controller 440 includes one or more software applications loaded on one or more elements of the host device 435. In other implementations, as described above, the host controller 440 may include any of several other programs, machines, and devices operating independently or collectively to control the host device 435.

The host device 435 includes a login server 470 capable of enabling communications between client systems 405 and various elements of the host system 410, including elements such as OSP host complex 480 and IM host complex 490. The login server 470 may implement one or more authorization procedures to enable simultaneous access to one or more of these elements.

The OSP host complex 480 and the IM host complex 490 are typically connected through one or more OSP host complex gateways 485 and one or more IM host complex gateways 495. Each OSP host complex gateway 485 and IM host complex gateway 495 may generally perform protocol conversions necessary to enable communication between one or more of the OSP host complex 480, the IM host complex 490, and the Internet 465.

The OSP host complex 480 supports a set of services to be accessed through and/or performed by from one or more servers located internal to and external from the OSP host complex 480. Servers external to the OSP host complex 480 may communicate using the Internet 465. Servers internal to the OSP complex 480 may be arranged in one or more configurations. For example, servers may be arranged in large centralized clusters identified as farms 4802 or in localized clusters identified as pods 4804.

More specifically, farms 4802 are groups of servers located at centralized locations within the OSP host complex 480. Farms 4802 generally are dedicated to providing particular functionality and services to subscribers and clients from a centralized location, regardless of the location of the subscriber or client. Farms 4802 are particularly useful for providing services that depend upon other remotely-located or performed processes and services for information, such as, for example, chat, email, instant messaging, news, newsgroups, search, stock updates, and weather. Thus, farms 4802 tend to rely on connections with external resources such as the Internet 465 and/or other servers within the OSP host complex 480.

By contrast to farms 4802, pods 4804 are clusters of localized servers that provide some services offered by the OSP host complex 480 from a location local to the service or information recipient, which reduces and avoids time delays and congestion inherent in centralized processing. Each pod 4804 includes one or more interrelated servers capable of operating together to provide one or more services offered by the OSP host complex 480 in a geographically localized manner, with the servers of a pod 4804 generally operating independently of resources external to the pod 4804. A pod 4804 may cache content received from external sources, such as farms 4802 or the Internet 465, making frequently requested information readily available to the local service or information recipients served by the pod 4804. In this way, pods 4804 are particularly useful in providing services that are independent of other processes and servers such as, for example, routing to other localized resources or recipients, providing access to keywords and geographically specific content, providing access to routinely accessed information, and downloading certain software and graphical interface updates with reduced processing time and congestion. The determination of which servers and processes are located in the pod 4804 is made by the OSP according to load distribution, frequency of requests, demographics, and other factors.

In addition to farms 4802 and pods 4804, the implementation of FIG. 4 also includes one or more non-podded and non-farmed servers 4806. In general, the servers 4806 may be dedicated to performing a particular service or information that relies on other processes and services for information and may be directly or indirectly connected to resources outside of the OSP host complex 480, such as the Internet 465 and the IM host complex 490, through an OSP gateway 4808 within OSP host complex gateway 485. In the event that subscriber usage of a particular service or information of the servers 4806 becomes relatively high, those servers 4806 may be integrated into a farm or pod, as appropriate.

In the implementation of FIG. 4, one particular exemplary pod 4810 is shown in more detail. Pod 4810 includes a routing processor 4812. In a packet-based implementation, the client system 405 may generate information requests, convert the requests into data packets, sequence the data packets, perform error checking and other packet-switching techniques, and transmit the data packets to the routing processor 4812. Upon receiving data packets from the client system 405, the routing processor 4812 may directly or indirectly route the data packets to a specified destination within or outside of the OSP host complex 480. In general, the routing processor 4812 will examine an address field of a data request, use a mapping table to determine the appropriate destination for the data request, and direct the data request to the appropriate destination.

For example, in the event that a data request from the client system 405 can be satisfied locally, the routing processor 4812 may direct the data request to a local server 4814 in the pod 4810. In the event that the data request cannot be satisfied locally, the routing processor 4812 may direct the data request internally to one or more farms 4802, one or more other pods 4804, or one or more non-podded servers 4806 in the OSP host complex 480, or the routing processor 4812 may direct the data request externally to elements such as the IM host complex 490 through an OSP/pod gateway 4816.

The routing processor 4812 also may direct data requests and/or otherwise facilitate communication between the client system 405 and the Internet 465 through the OSP/pod gateway 4816. In one implementation, the client system 405 uses an OSP client application to convert standard Internet content and protocols into OSP protocols and vice versa, where necessary. For example, when a browser application transmits a request in a standard Internet protocol, the OSP client application can intercept the request, convert the request into an OSP protocol and send the converted request to the routing processor 4812 in the OSP host complex 480. The routing processor 4812 recognizes the Internet 465 as the destination and routes the data packets to an IP ("Internet Protocol") tunnel 4818. The IP tunnel 4818 converts the data from the OSP protocol back into standard Internet protocol and transmits the data to the Internet 465. The IP tunnel 4818 also converts the data received from the Internet in the standard Internet protocol back into the OSP protocol and sends the data to the routing processor 4812 for delivery back to the client system 405. At the client system 405, the OSP client application converts the data in the OSP protocol back into standard Internet content for communication with the browser application.

The IP tunnel 4818 may act as a buffer between the client system 405 and the Internet 465, and may implement content filtering and time saving techniques. For example, the IP tunnel 4818 can check parental controls settings of the client system 405 and request and transmit content from the Internet 465 according to the parental control settings. In addition, the IP tunnel 4818 may include a number a caches for storing frequently accessed information. If requested data is determined to be stored in the caches, the IP tunnel 4818 may send the information to the client system 405 from the caches and avoid the need to access the Internet 465.

In another implementation, the client system 405 may use standard Internet protocols and formatting to access pods 4810 and the Internet 465. For example, the subscriber can use an OSP TV client application having an embedded browser application installed on the client system 405 to generate a request in standard Internet protocol, such as HTTP ("HyperText Transport Protocol"). In a packet-based implementation, data packets may be encapsulated inside a standard Internet tunneling protocol, such as, for example, UDP ("User Datagram Protocol"), and routed to a web tunnel 41010. The web tunnel 41010 may be a L2TP ("Layer Two Tunneling Protocol") tunnel capable of establishing a point-to-point protocol (PPP) session with the client system 405. The web tunnel 41010 provides a gateway to the routing processor 4812 within the pod 4810, the Internet 465, and a web proxy 4822.

The web proxy 4822 can look up subscriber information from the IP address of the client system 405 to determine demographic information such as the subscriber's parental control settings. In this way, the web proxy 4822 can tailor the subscriber's content and user interfaces. The web proxy 4822 can also perform caching functions to store certain URLs ("Uniform Resource Locators") and other electronic content so that the web proxy 4822 can locally deliver information to the client system 405 and avoid the need to access the Internet 465 in the event that data requested by the client system 405 has been cached.

Figure 5:
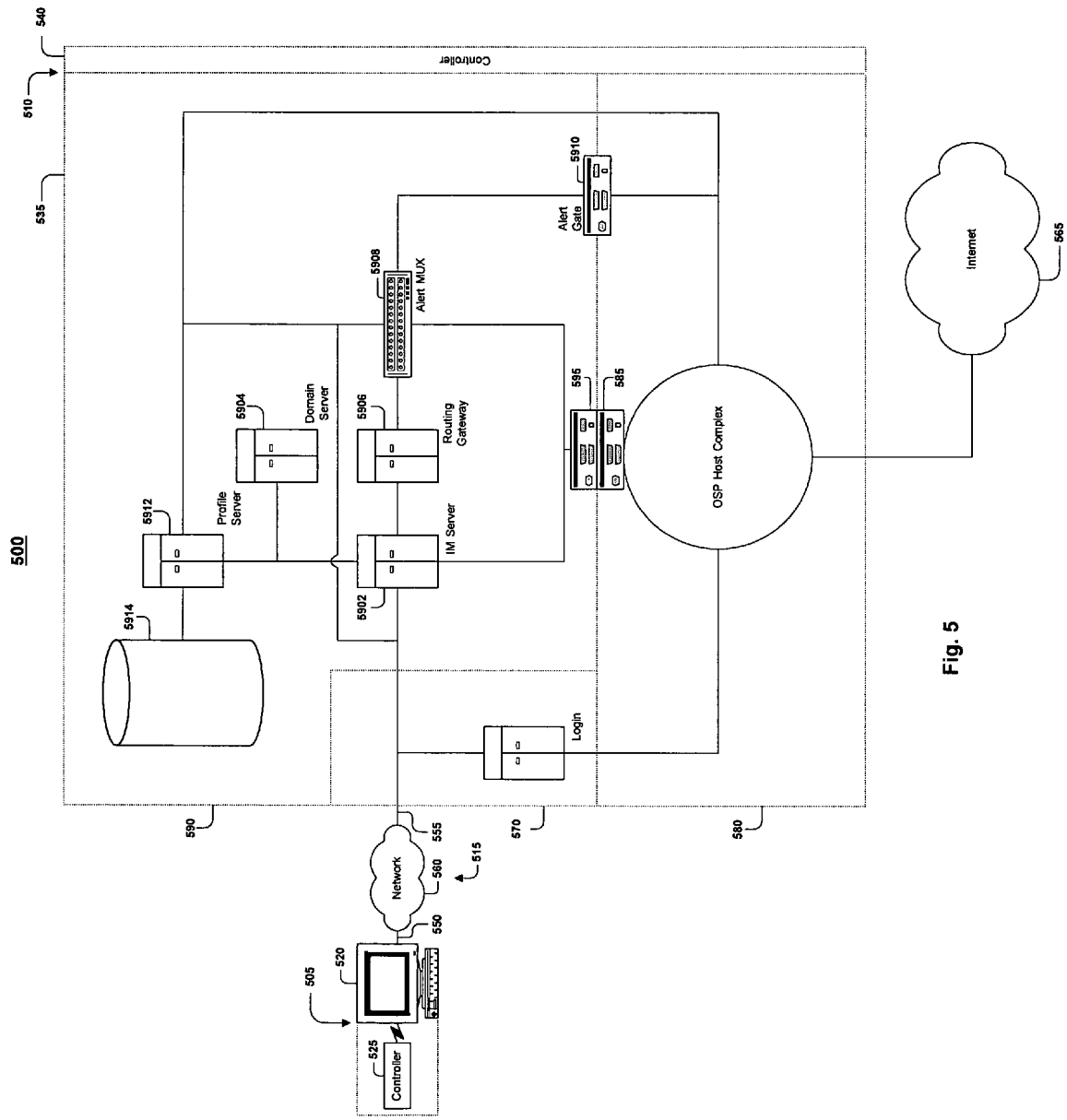

Referring to FIG. 5, a communications system 500 is capable of delivering and exchanging information between a client system 505 and a host system 510 through a communication link 515. Client system 505 typically includes one or more client devices 520 and one or more client controllers 525 for controlling the client devices 520. Host system 510 typically includes one or more host devices 535 and one or more host controllers 540 for controlling the host devices 535. The communications link 515 may include communication pathways 550, 555 enabling communications through the one or more delivery networks 560. As shown, the client system 505 may access the Internet 565 through the host system 510.

Examples of each element within the communication system of FIG. 5 are broadly described above with respect to FIGS. 1-4. In particular, the client system 505 and the communications link 515 typically have attributes comparable to those described with respect to client systems 105, 205, 305, and 405 and communications links 115, 215, 315, and 415 of FIGS. 1-4, Likewise, the host system 510 of FIG. 5 may have attributes comparable to and may illustrate one possible embodiment of the host systems 110, 210, 310, and 410 shown in FIGS. 1-4. FIG. 5 describes an aspect of the host system 510, focusing primarily on one particular implementation of IM host complex 590.

The client system 505 includes a client device 520 and a client controller 525. The client controller 525 is generally capable of establishing a connection to the host system 510, including the OSP host complex 580, the IM host complex 590 and/or the Internet 565. In one implementation, the client controller 525 includes an IM application for communicating with servers in the IM host complex 590 utilizing exclusive IM protocols. The client controller 525 also may include applications, such as an OSP client application and/or an Internet browser application, for communicating with elements such as the OSP host complex 580 and the Internet 565.

The host system 510 includes a host device 535 and a host controller 540. The host controller 540 is generally capable of transmitting instructions to any or all of the elements of the host device 535. For example, in one implementation, the host controller 540 includes one or more software applications loaded on one or more elements of the host device 535. In other implementations, as described above, the host controller 540 may include any of several other programs, machines, and devices operating independently or collectively to control the host device 535.

The host system 510 includes a login server 570 capable of enabling communications between client systems 505 and various elements of the host system 510, including elements such as the OSP host complex 580 and IM host complex 590; login server 570 is also capable of authorizing access by the client system 505 and those elements. The login server 570 may implement one or more authorization procedures to enable simultaneous access to one or more of the elements. The OSP host complex 580 and the IM host complex 590 are connected through one or more host complex gateways 585 and one or more IM host complex gateways 595. Each OSP host complex gateway 585 and IM host complex gateway 595 may perform any protocol conversions necessary to enable communication between the OSP host complex 580, the IM host complex 590, and the Internet 565.

To access the IM host complex 590 to begin an instant messaging session, the client system 505 establishes a connection to the login server 570. The login server 570 typically determines whether the particular subscriber is authorized to access the IM host complex 590 by verifying a subscriber identification and password. If the subscriber is authorized to access the IM host complex 590, the login server 570 employs a hashing technique on the subscriber's screen name to identify a particular IM server 5902 for use during the subscriber's session. The login server 570 provides the client system 505 with the IP address of the particular IM server 5902, gives the client system 505 an encrypted key (i.e., a cookie), and breaks the connection. The client system 505 then uses the IP address to establish a connection to the particular IM server 5902 through the communications link 515, and obtains access to that IM server 5902 using the encrypted key. Typically, the client system 505 will be equipped with a winsock API ("Application Programming Interface") that enables the client system 505 to establish an open TCP connection to the IM server 5902.

Once a connection to the IM server 5902 has been established, the client system 505 may directly or indirectly transmit data to and access content from the IM server 5902 and one or more associated domain servers 5904. The IM server 5902 supports the fundamental instant messaging services and the domain servers 5904 may support associated services, such as, for example, administrative matters, directory services, chat and interest groups. The domain servers 5904 can be used to lighten the load placed on the IM server 5902 by assuming responsibility for some of the services within the IM host complex 590. By accessing the IM server 5902 and/or the domain server 5904, a subscriber can use the IM client application to view whether particular subscribers ("buddies") are online, exchange instant messages with particular subscribers, participate in group chat rooms, trade files such as pictures, invitations or documents, find other subscribers with similar interests, get customized news and stock quotes, and search the Web.

In the implementation of FIG. 5, IM server 5902 is directly or indirectly connected to a routing gateway 5906. The routing gateway 5906 facilitates the connection between the IM server 5902 and one or more alert multiplexors 5908. For example, routing gateway 5906 may serve as a link minimization tool or hub to connect several IM servers 5902 to several alert multiplexors 5908. In general, an alert multiplexor 5908 maintains a record of alerts and subscribers registered to receive the alerts.

Once the client system 505 is connected to the alert multiplexor 5908, a subscriber can register for and/or receive one or more types of alerts. The connection pathway between the client system 505 and the alert multiplexor 5908 is determined by employing a hashing technique at the IM server 5902 to identify the particular alert multiplexor 5908 to be used for the subscriber's session. Once the particular multiplexor 5908 has been identified, the IM server 5902 provides the client system 505 with the IP address of the particular alert multiplexor 5908 and gives the client system 505 an encrypted key (i.e., a cookie) used to gain access to the identified multiplexor 5908. The client system 505 then uses the IP address to connect to the particular alert multiplexor 5908 through the communication link 515 and obtains access to the alert multiplexor 5908 using the encrypted key.

The alert multiplexor 5908 is connected to an alert gate 5910 that, like the IM host complex gateway 595, is capable of performing the necessary protocol conversions to enable communication with the OSP host complex 580. The alert gate 5910 is the interface between the IM host complex 590 and the physical servers, such as servers in the OSP host complex 580, where state changes are occurring. In general, the information regarding state changes will be gathered and used by the IM host complex 590. The alert multiplexor 5908 also may communicate with the OSP host complex 580 through the IM gateway 595, for example, to provide the servers and subscribers of the OSP host complex 580 with certain information gathered from the alert gate 5910.

The alert gate 5910 can detect an alert feed corresponding to a particular type of alert. The alert gate 5910 may include a piece of code (alert receive code) capable of interacting with another piece of code (alert broadcast code) on the physical server where a state change occurs. In general, the alert receive code installed on the alert gate 5910 instructs the alert broadcast code installed on the physical server to send an alert feed to the alert gate 5910 upon the occurrence of a particular state change. Thereafter, upon detecting an alert feed, the alert gate 5910 contacts the alert multiplexor 5908, which in turn, informs the appropriate client system 505 of the detected alert feed.

In the implementation of FIG. 5, the IM host complex 590 also includes a subscriber profile server 5912 connected to a database 5914 for storing large amounts of subscriber profile data. The subscriber profile server 5912 may be used to enter, retrieve, edit, manipulate, or otherwise process subscriber profile data. In one implementation, a subscriber's profile data includes, for example, the subscriber's buddy list, alert preferences, designated stocks, identified interests, geographic location and other demographic data. The subscriber may enter, edit and/or delete profile data using an installed IM client application on the client system 505 to interact with the subscriber profile server 5912.

Because the subscriber's data is stored in the IM host complex 590, the subscriber does not have to reenter or update such information in the event that the subscriber accesses the IM host complex 590 using a new or different client system 505. Accordingly, when a subscriber accesses the IM host complex 590, the IM server 5902 can instruct the subscriber profile server 5912 to retrieve the subscriber's profile data from the database 5914 and to provide, for example, the subscriber's buddy list to the IM server 5902 and the subscriber's alert preferences to the alert multiplexor 5908. The subscriber profile server 5912 also may communicate with other servers in the OSP host complex 590 to share subscriber profile data with other services. Alternatively, user profile data may be saved locally on the client device 505.

Figure 6:
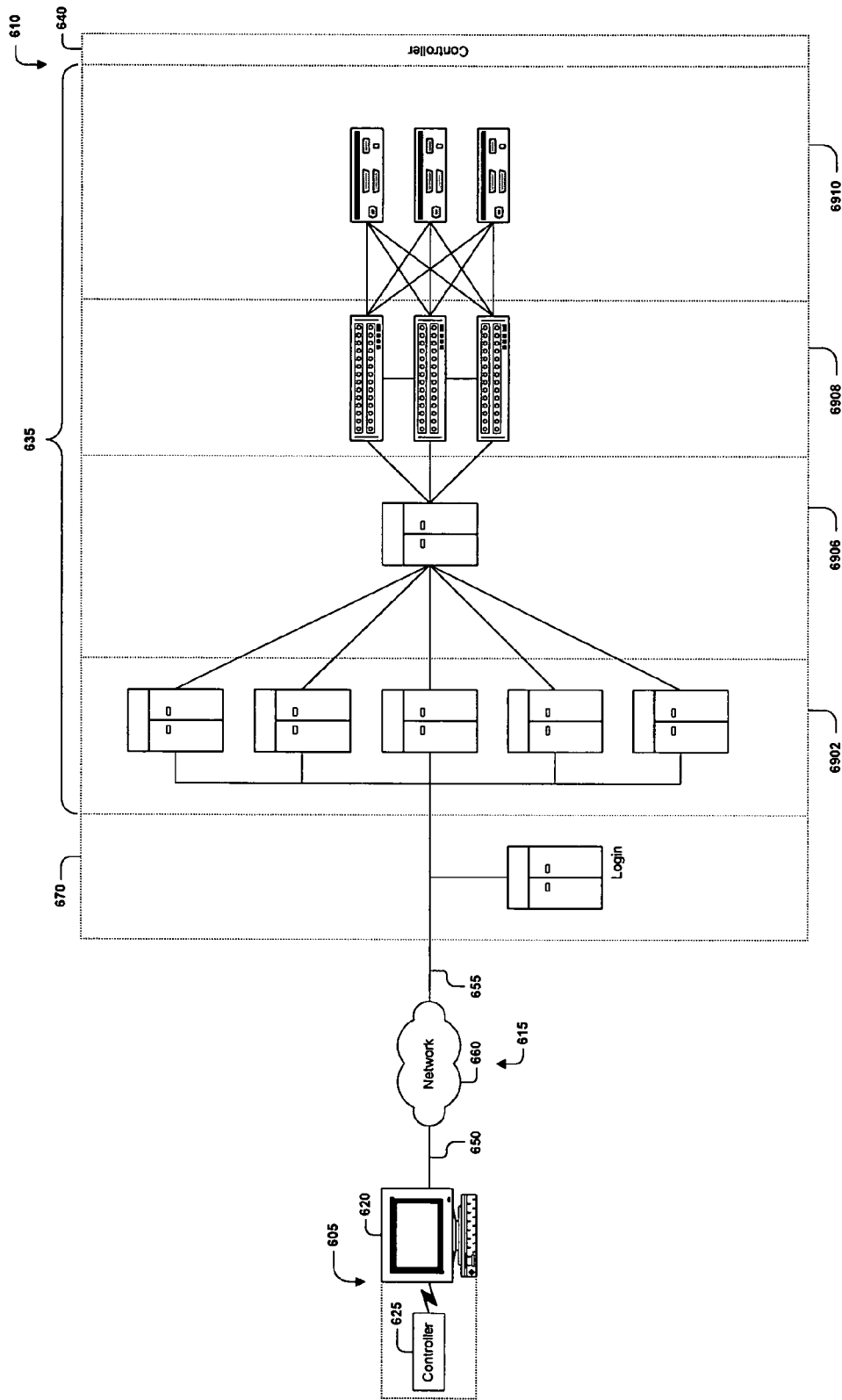

Referring to FIG. 6, a communications system 600 is capable of delivering and exchanging information between a client system 605 and a host system 610 through a communication link 615. Client system 605 typically includes one or more client devices 620 and one or more client controllers 625 for controlling the client devices 620. Host system 610 typically includes one or more host devices 635 and one or more host controllers 640 for controlling the host devices 635. The communications link 615 may include communication pathways 650, 655 enabling communications through the one or more delivery networks 660.

Examples of each element within the communication system of FIG. 6 are broadly described above with respect to FIGS. 1-5. In particular, the client system 605 and the communications link 615 typically have attributes comparable to those described with respect to client systems 105, 205, 305, 405 and 505 and communications links 115, 215, 315, 415 and 515 of FIGS. 1-5. Likewise, the host system 610 of FIG. 6 may have attributes comparable to and may illustrate one possible embodiment of the host systems 110, 210, 310, 410 and 510 shown in FIGS. 1-5. FIG. 6 describes several aspects of one implementation of the host system 610 in greater detail, focusing primarily on one particular implementation of the login server 670 and IM host complex 690.

The client system 605 includes a client device 620 and a client controller 625. The client controller 625 is generally capable of establishing a connection to the host system 610, including the IM host complex 690. In one implementation, the client controller 625 includes an IM application for communicating with servers in the IM host complex 690 utilizing exclusive IM protocols.

The host system 610 includes a host device 635 and a host controller 640. The host controller 640 is generally capable of transmitting instructions to any or all of the elements of the host device 635. For example, in one implementation, the host controller 640 includes one or more software applications loaded on one or more elements of the host device 635. In other implementations, as described above, the host controller 640 may include any of several other programs, machines, and devices operating independently or collectively to control the host device 635.

The host system 610 includes a login server 670 capable of enabling communications between client systems 605 and various elements of the host system 610, including elements such as the IM host complex 690 and the OSP host complex 680; login server 670 is also capable of authorizing access by the client system 605 and those elements. The IM host complex 690 includes an IM server network 6902, a routing gateway 6906, an alert multiplexor network 6908, and one or more alert gates 6910. The IM server network 6902 may include an interconnected network of IM servers and the alert multiplexor network 6908 may include an interconnected network of alert multiplexors. In the implementation of FIG. 6, the IM server network 6902 and the alert multiplexor network 6908 are interconnected by a routing gateway 6906 that serves as a common hub to reduce the number of connections. Each IM server within IM server network 6902 can directly or indirectly communicate and exchange information with one or more of the alert multiplexors in the alert multiplexor network 6908. Each of the alert multiplexors in the alert multiplexor network 6908 may be connected to several alert gates 6910 that receive different types of alerts.

During a session, a subscriber typically will be assigned to one IM server in the IM server network 6902 and to one alert multiplexor in the alert multiplexor network 6908 based on one or more hashing techniques. In one implementation, for example, each IM server in the IM server network 6902 may be dedicated to serving a particular set of registered subscribers. Because all of the IM servers can communicate with each other, all subscribers can communicate with each other through instant messaging. However, the IM servers and the alert multiplexors are capable of storing subscriber information and other electronic content that may be accessed by the other IM servers and alert multiplexors. Thus, in another implementation, each alert multiplexor in the alert multiplexor network 6908 may be dedicated to storing information about a particular set or subset of alerts. Because all of the alert multiplexors can communicate with each other, all registered subscribers can receive all types of alerts. This networking arrangement enables the load to be distributed among the various servers in the IM host complex 690 while still enabling a subscriber to communicate, share information, or otherwise interact with other subscribers and servers in the IM host complex 690.

Figure 7:
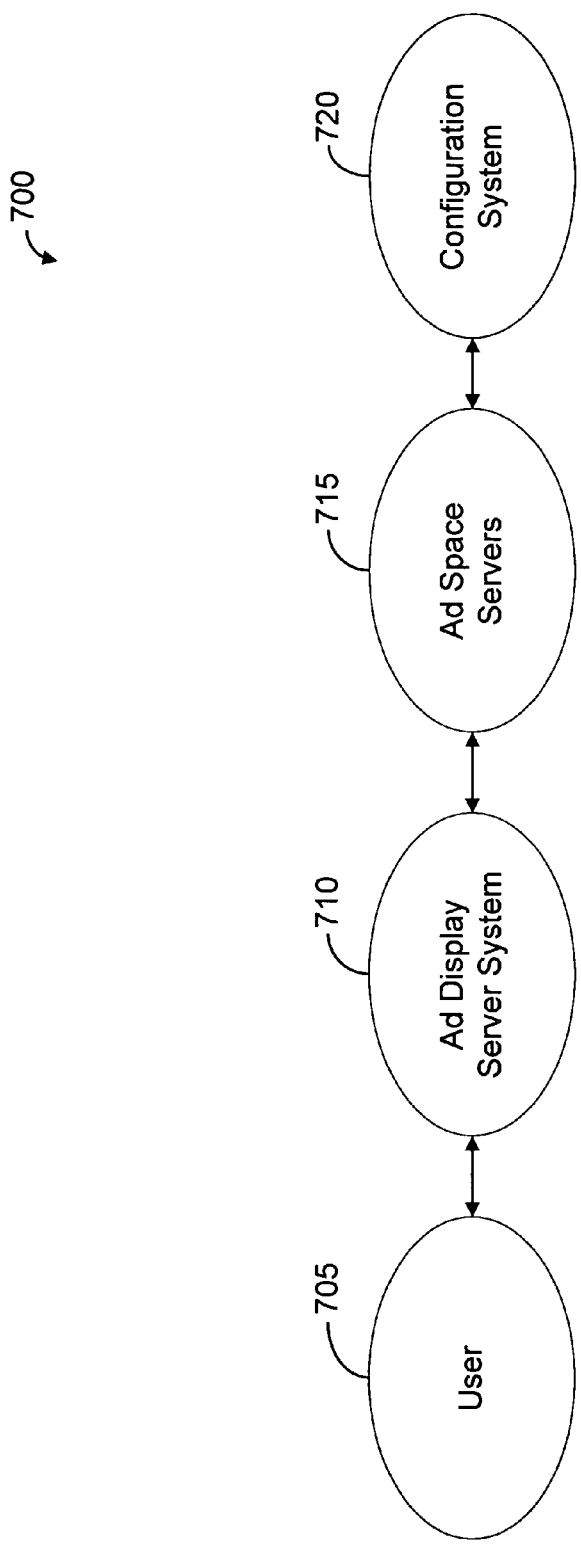
FIG. 7 is a block diagram illustrating an advertisement delivery system.

Referring to FIG. 7, an advertisement delivery system 700 includes a user 705, an ad display server system 710, ad space servers 715, and a configuration system 720. The advertisement delivery system 700 is suitable for use by an advertising host in a communication system such as that shown and described with respect to FIGS. 1-6, with user 705 generally corresponding to client systems 105, 205, 305, 405, 505, and/or 605, and other components of system 700 generally corresponding to elements within host systems 110, 210, 310, 410, 510, and/or 610.

Ad display server system 710, ad space servers 715 and configuration system 720 may also be exemplified by one or more pods 4804 of FIG. 4. Additionally or alternatively, ad display server system 710, ad space servers 715 and configuration system 720 may be exemplified by one or more non-podded servers, such as servers 4806 or farms 4802 of FIG. 4. Ad space servers 715 and other servers included as components of ad display server system 710 and configuration system 720, also may be exemplified by one or more electronic data stores (e.g., database).

Typically, a user 705 accesses the online platform and a request is sent to the ad display server system 710. The request includes identification information (e.g., an identification number) uniquely identifying the ad space which the user is viewing, and possibly also demographic data or identifying information for the user. An ad display server system 710 presents advertisements to the user 705 by displaying the advertisements on the computer screen of the user 705 where the displaying may include various perceivable formats (e.g., visual, audio). The ad display server system 710 employs a hashing technique on the ad space that the user has accessed to identify a particular ad space server 715 that is associated with that ad space. Based on the result of the hashing technique, the ad display server system 710 directs an advertising request for that ad space to the associated ad space server 715. The ad space server 715 also may receive identification data about the user 705 from the ad display server system 710 and determine which advertisements to show in that ad space based on attributes, preferences, and/or historical information associated with that user 705.

Ad space servers 715 may also receive configuration files from a configuration system 720. These configuration files provide instructions to each of the ad space servers 715 regarding which advertisements should be displayed to users 705 over a given time period. The configuration system 720 logs data about which advertisements were shown to which ad spaces over a defined time period (e.g., the last 24 hours, the last 14 days), and then generates configuration files for each ad space using the logged data.

Figure 8:
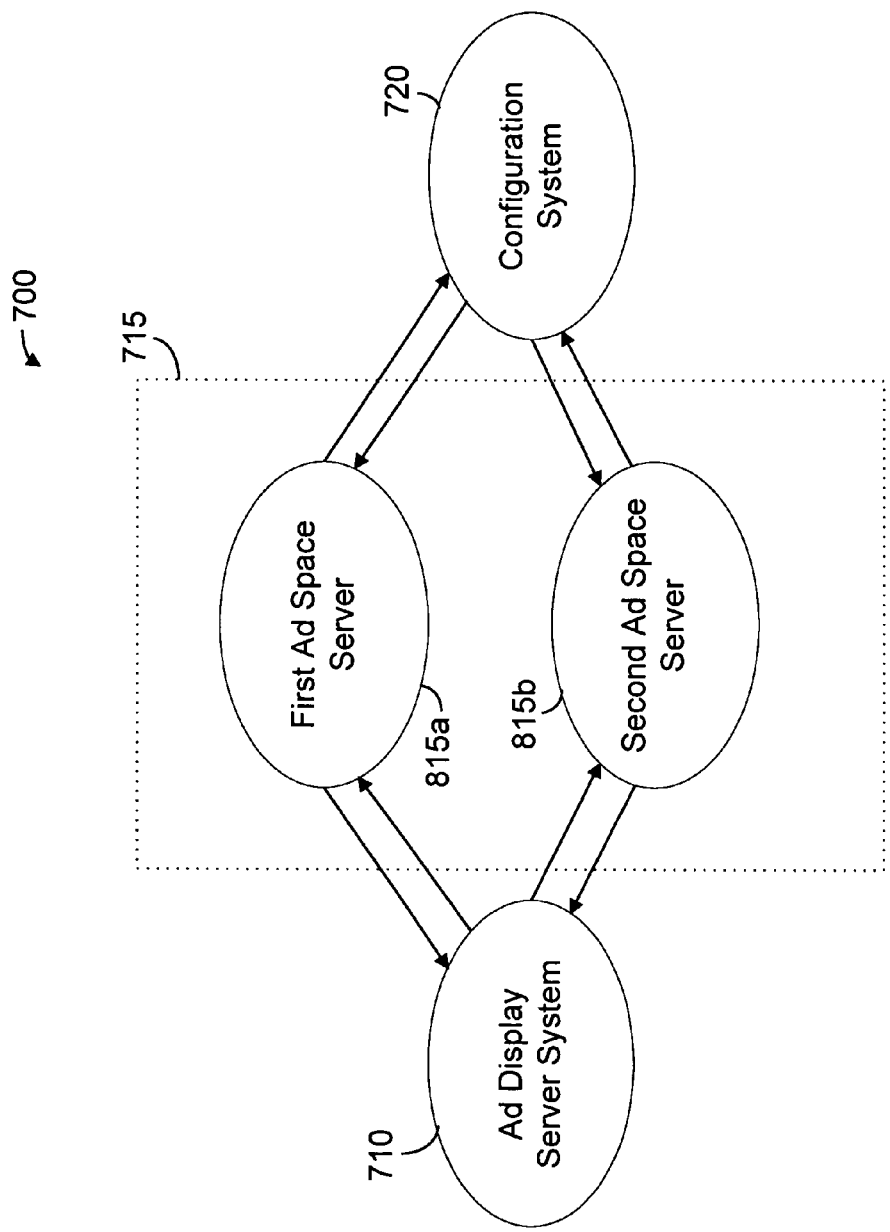
FIG. 8 is a block diagram providing a more detailed illustration of the ad space servers and other components of the advertisement delivery system of FIG. 7.

Referring to FIG. 8, ad space servers 715 may include a first ad space server 815a and a second ad space server 815b. In one embodiment, the first ad space server 815a is structured and arranged to deliver advertisements to a first region of a display, and the second ad space server 815b is structured and arranged to deliver advertisements to a second region of the display that differs from the first region.

The ad display server system 710 generally directs its output to one or more appropriate ad space servers based on the ad space to which an advertisement will be directed. Output from the ad display server system 710 is sent to the first ad space server 815a if the advertisement is to be directed to an ad space controlled by the first ad space server 815a. Similarly, output from ad display server system 710 is sent to the second ad space server 815b if the advertisement is to be directed to an ad space controlled by the second ad space server 815b. The ad display server system 710 may employ a hashing technique to determine which ad space server 815a, 815b controls the delivery of advertisements to a particular ad space.

The ad display server system 710 may provide demographic data as part of its advertisement request. The first ad space server 815a and the second ad space server 815b may use the provided demographic data to determine which advertisements to send to the ad display server system 710. For example, based on the advertisement request having associated demographic data sent by the ad display server system 710, the first ad space server 815a determines which of several available advertisements to display in the first region of the display. Similarly, the second ad display server 815*b* determines which of several advertisements to display in the second region of the display. Ultimately, these selected advertisements are communicated to the ad display server system 710.

The configuration system 720 typically generates at least one of a first configuration file that includes instructions for displaying advertisements in the ad spaces controlled by the first ad space server 815*a* and a second configuration file, which may or may not differ from the first configuration file, and that includes instructions for displaying advertisements in the ad spaces controlled by the second ad space server 815*b*. The first ad space server 815*a* receives the first configuration file that includes the instructions for displaying advertisements within the first region, and the second ad space server 815*b* receives the second configuration file that includes the instructions for displaying advertisements within the second region.

In one implementation, the first configuration file replaces the configuration file currently being used by the first ad space server 815*a*, and the second configuration file replaces the configuration file currently being used by the second ad space server 815*b*. In another implementation, the first configuration file modifies the configuration file being used by the first ad space server 815*a*, and the second configuration file modifies the configuration file being used by the second ad space server 815*b*.

Figure 9A:
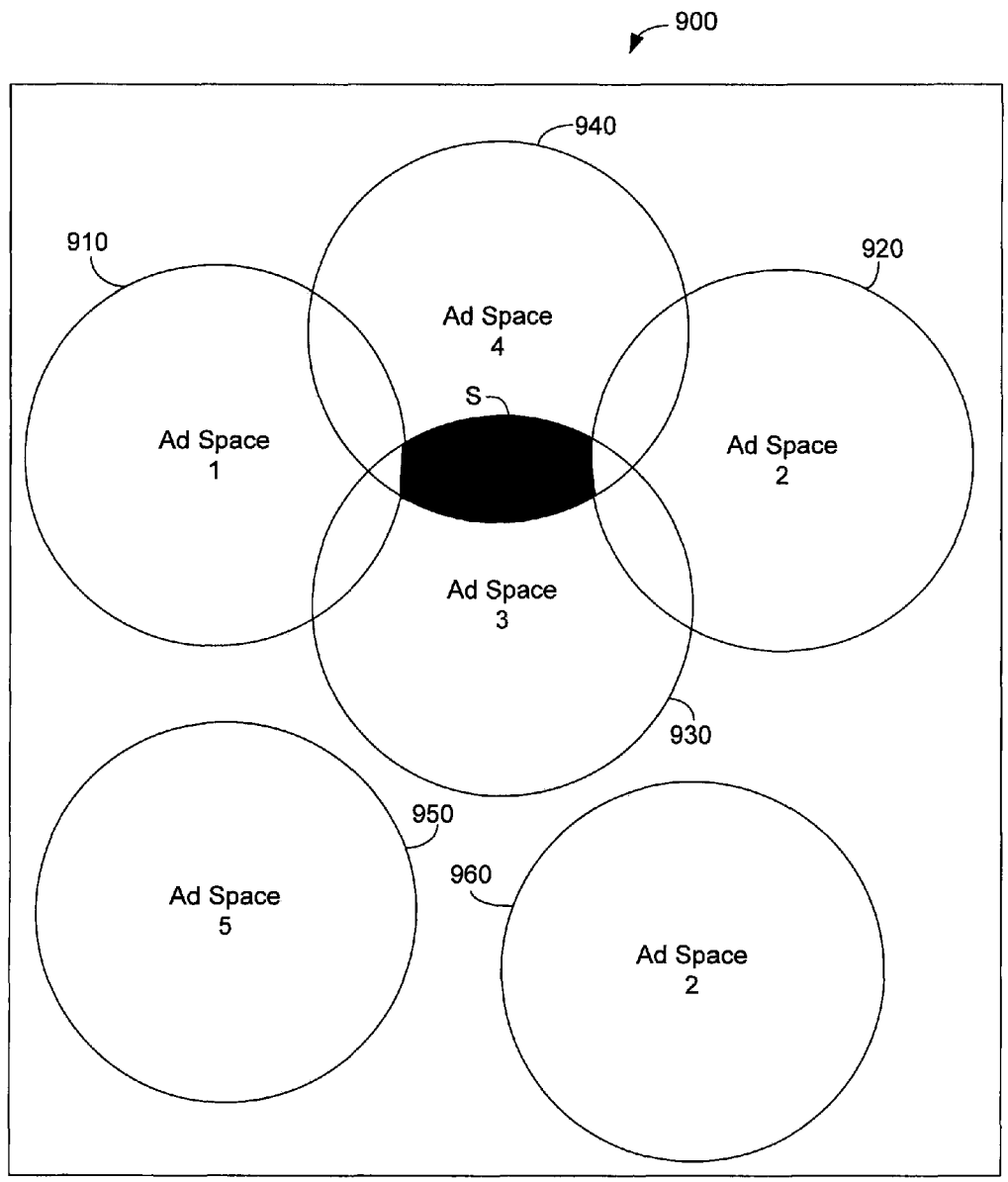
FIG. 9*a* is a Venn diagram that illustrates ad spaces on a display.

Referring to FIG. 9*a*, a Venn diagram 900 is used as merely one example to illustrate the relative orientation between several different ad spaces 910, 920, 930, 940, 950 and 960 on a display that are each supplied advertisements by their respective ad space servers. There may or may not be limits to the number of ad spaces that can be created.

Multiple ad space servers 715 may be used, each being dedicated to one or more specific ad spaces. More specifically, in one implementation, each ad space server 715 is responsible for supplying advertisements to one particular ad space. For example, an ad space server 715 may be responsible for only ad space 910. Alternatively or additionally, in another implementation, each ad space server 715 may be dedicated to one or more ad spaces. As another example, an ad space server may be responsible for more than one ad space, such as ad spaces 920 and 960. Moreover the ad spaces may or may not be evenly divided across the available ad space servers. For example, one ad space server 715 may be devoted to serving a small number of popular ad spaces, while another ad space server 715 may serve a large number of infrequently visited ad spaces. This division of labor among ad space servers 715 enhances scalability, thereby enabling the advertisement delivery system 700, as a whole, to handle a large volume of advertisements, users, and configuration data while minimizing performance degradation. Because advertising on the Internet has become increasingly prevalent, dividing the advertising load across multiple ad spaces and corresponding ad space servers 715 helps to make the resultant high volume of ad traffic more manageable. With such a division, the advertisement delivery system 700 maintains its scalability, which prevents the system from becoming bogged down under heavy ad traffic.

An important effect of using more than one ad space server 715 is that the universe of ad spaces becomes divided into groups of manageable size. This allows the system 700 to generate and transfer configuration files that are small enough to download quickly and frequently, thereby facilitating smooth and continuous system operation.

Typically, overlapping ad spaces, such as ad spaces 910-940, are served advertisements by their corresponding ad space servers at different times. For instance, ad spaces 930 and 940 generally do not receive advertisements at the same time. Rather, advertisements delivered to those overlapping ad spaces are staggered in time. Thus, if an advertisement is delivered to ad space 930 at time t1, a different advertisement is not generally delivered to ad space 940 at the same time t1.

However, it is possible to serve advertisements to overlapping ad spaces simultaneously. Typically, using standard HTML protocols, the intersecting section common to two overlapping ad spaces will display content corresponding to the last served advertisement. For instance, when advertisements are simultaneously served to overlapping ad spaces 930 and 940, the intersecting section between those ad spaces (see shaded section S between ad space 930 and ad space 940) will display content corresponding to the last served advertisement, whether that advertisement is served to ad space 930 or ad space 940. Conversely, using a different protocol, the intersecting section may display content based on some criteria other than temporal ranking, or it may display content representing some amalgamation of the content served to each of the overlapping ad spaces.

Figure 9B:
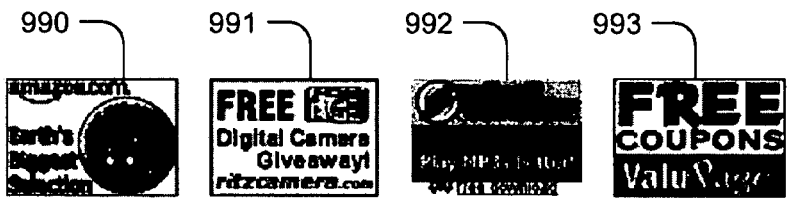
FIG. 9*b* is a screen shot illustrating multiple online advertisements.
Figure 9B:
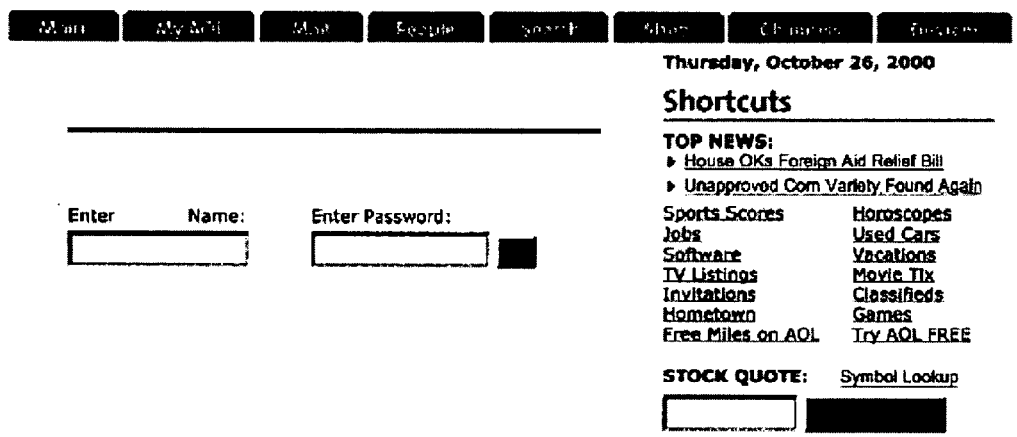

Referring to FIG. 9*b*, a screen shot 970 is shown that illustrates multiple ad spaces 990, 991, 992, and 993 that are not overlapping, but instead, are mutually exclusive of one another. In this illustration, each ad space 990, 991, 992, and 993, may correspond to different ad space servers 715. Alternatively or additionally, one or more than one of the ad spaces 990, 991, 992, and 993 may be served by the same ad space server 715.

Figure 10A:
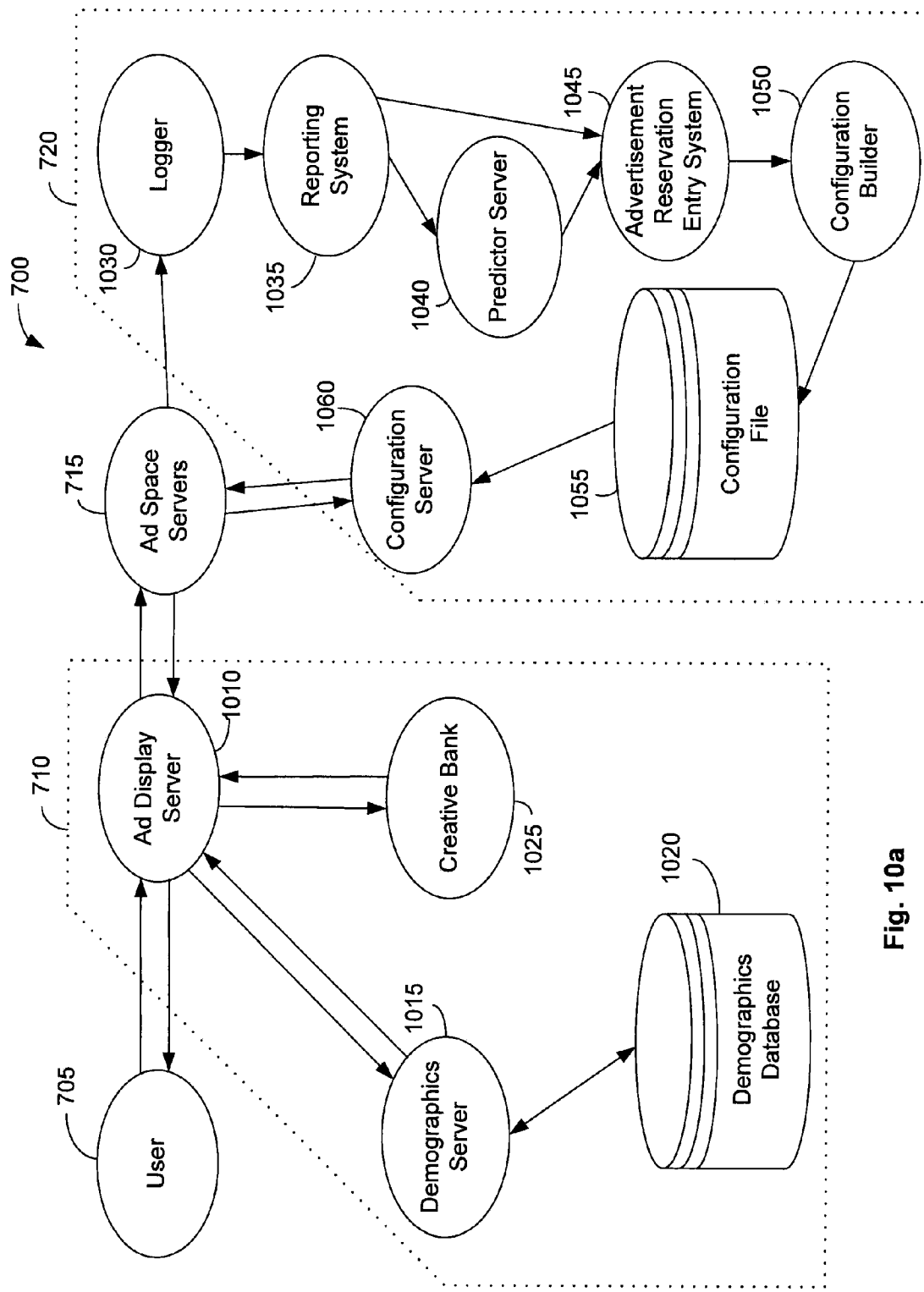
FIG. 10*a* is a block diagram providing a more detailed illustration of the components and relative orientation of the advertisement delivery system of FIG. 7, according to a first preferred implementation.

FIG. 10*a* is a block diagram providing a more detailed illustration of components within an exemplary advertisement delivery system 700. In particular, FIG. 10*a* shows user 705, a more detailed illustration of the ad display server system 710, ad space servers 715, and a more detailed illustration of the configuration system 720. As shown, the ad display server system 710 includes an ad display server 1010, a demographics server 1015, a demographics database 1020, and a creative bank 1025. The configuration system 720 includes a logger 1030, a reporting system 1035, a predictor server 1040, an advertisement reservation entry system 1045, a configuration builder 1050, a configuration file 1055, and a configuration server 1060.

The ad display server 1010 is the primary interface for a user 705. When a user 705 performs one of several specific actions, such as logging on to an online service or requesting access to a web page, the ad display server 1010 can be accessed to retrieve an advertisement for display on the computer monitor of the user 705. Ad display server 1010 may include one or more hardware and/or software components, examples of which are discussed above with respect to the ad display server system 710.

As one illustration, each web page requested by user 705 may include one or more ad spaces within which advertisements are presented to the user 705. To determine which advertisement to display, the ad display server 1010 makes a request to the appropriate ad space server 715. The ad space server 715 receives periodic instructions from the configuration server 1060. The ad display server 1010 employs a hashing technique to determine which ad space server 715 controls the content for the requested ad space. For each ad space, the associated ad space server 715 may further decide which advertisement should be displayed based on the ad space's configuration, and the user's demographic data.

In addition to being the primary interface with users 705, the ad display server 1010 interfaces with a demographics server 1015. Demographics server 1015 may include one or more hardware components and/or software components, examples of which are discussed above with respect to the ad display server system 710.

The demographics server 1015 is the interface between the ad display server 1010 and a demographics database 1020. The demographics database 1020 includes demographic data about users 705. An example of a demographics database 1020 includes a relational database or any other type of database or combination thereof.

Demographic data within demographics database 1020 may be collected in various ways. For example, demographic data can be gathered from the users 705 of online services directly through the use of forms, questionnaires, and the like. For instance, when a user 705 accesses an online service for the first time, the online service may prompt the user 705 for various demographic data, such as gender, age, occupation, income level, and hobbies. Demographics may also be collected from third party sources. Regardless of how demographic data is collected, the ad display server 1010 sends the demographic data to the demographics database 1020 via the demographics server 1015 for subsequent retrieval, for example, whenever that user 705 logs on to the online service. The ad display server 1010 also may send this data to the ad space servers 715 to determine which advertisements to display to user 705. The ad space servers 715 may make this determination based on the current demographic business rules for a particular ad space.

When the ad display server 1010 needs information about which advertisements to display to a given user 705, the demographics server 1015 may be queried. The demographics server 1015 will access and gather the necessary data from the demographics database 1020 and respond appropriately to the ad display server 1010.

Creative bank 1025 is a repository of graphical images, audio files, video files, intended for use as advertisements on computer monitors or other output devices. Creative bank 1025 may be implemented by using a relational database and may be included in database separate from or combined with demographics database 1020.

FIG. 10a also shows a more detailed illustration of an exemplary configuration system 720. After an advertisement has been displayed to a user 705, its display is reported by the ad space server 715 to a logger 1030, which tracks and records reported advertisement activity. Specifically, logger 1030 tracks and records each time an impression is displayed to user 705 for each ad space, and/or each time a user clicks on or otherwise responds to an advertisement.

The advertisement activity data is then passed to reporting system 1035, which compares the data with previously received historical data to derive statistics. Various reports generated by the reporting system 1035 summarize the information received from logger 1030, such as the total number of advertisements displayed in an ad space over a given time period or the total number of advertisements displayed in a particular ad space that were related to a particular ad campaign run by an advertiser.

The reporting system 1035 then passes the processed data to the predictor server 1040 and to the advertisement reservation entry system 1045. Predictor server 1040 uses the processed data to forecast future ad space availability and sends the forecast information to advertisement reservation entry system 1045. A predictor server 1040 uses an algorithm to predict the expected number of impressions to be served each ad space over a given time period. In one implementation, the predictor server 1040 bases the prediction on a 14 day average. For each ad space, the predictor server 1040 uses the average of the number of impressions served over the last 14 days to predict the number of impressions that will be served for that day.

The advertisement reservation entry system 1045 uses the processed data from the reporting system 1035 and the predictor server 1040 to take reservations and sell impressions for each available ad space. Orders for serving a number of impressions on a specific ad space over a given time frame are reserved in the entry system 1045. Based on historical data, the entry system 1045 stores information to determine how many impressions are available for each ad space over a defined future period of time, e.g., over the next five years. The entry system 1045 also factors in business rules based on demographics, so that specific ad spaces may be used to display advertisements directed to specific types of users 705.

Based on the information from the advertisement reservation entry system 1045, configuration builder 1050 generates configuration files 1055 to determine the frequency and identity of advertisements to be made available to specified and available ad spaces over a given time period, e.g., over the next day. From this determination, a configuration file 1055 for each ad space is built by configuration builder 1050, including instructions for appropriately displaying the advertisements. Other information may be included as part of each configuration file 1055, such as the "click-through" uniform resource locator ("URL") address for each advertisement. The configuration server 1060 sends each of these files to the corresponding ad space server 715, which uses the received instructions to determine which advertisement to serve to each incoming ad request. Details of an exemplary configuration server 1060 are described above with respect to aspects of configuration system 720.

Logger 1030, reporting system 1035, predictor server 1040, advertisement reservation entry system 1045, configuration builder 1050, and configuration server 1060 each may include one or more hardware components and/or software components. They each may also may include a software application loaded on a hardware component that operates as described herein. Other examples include a program, an algorithm, a piece of code, an instruction, or a combination thereof, for operating as described herein.

Figure 10B:
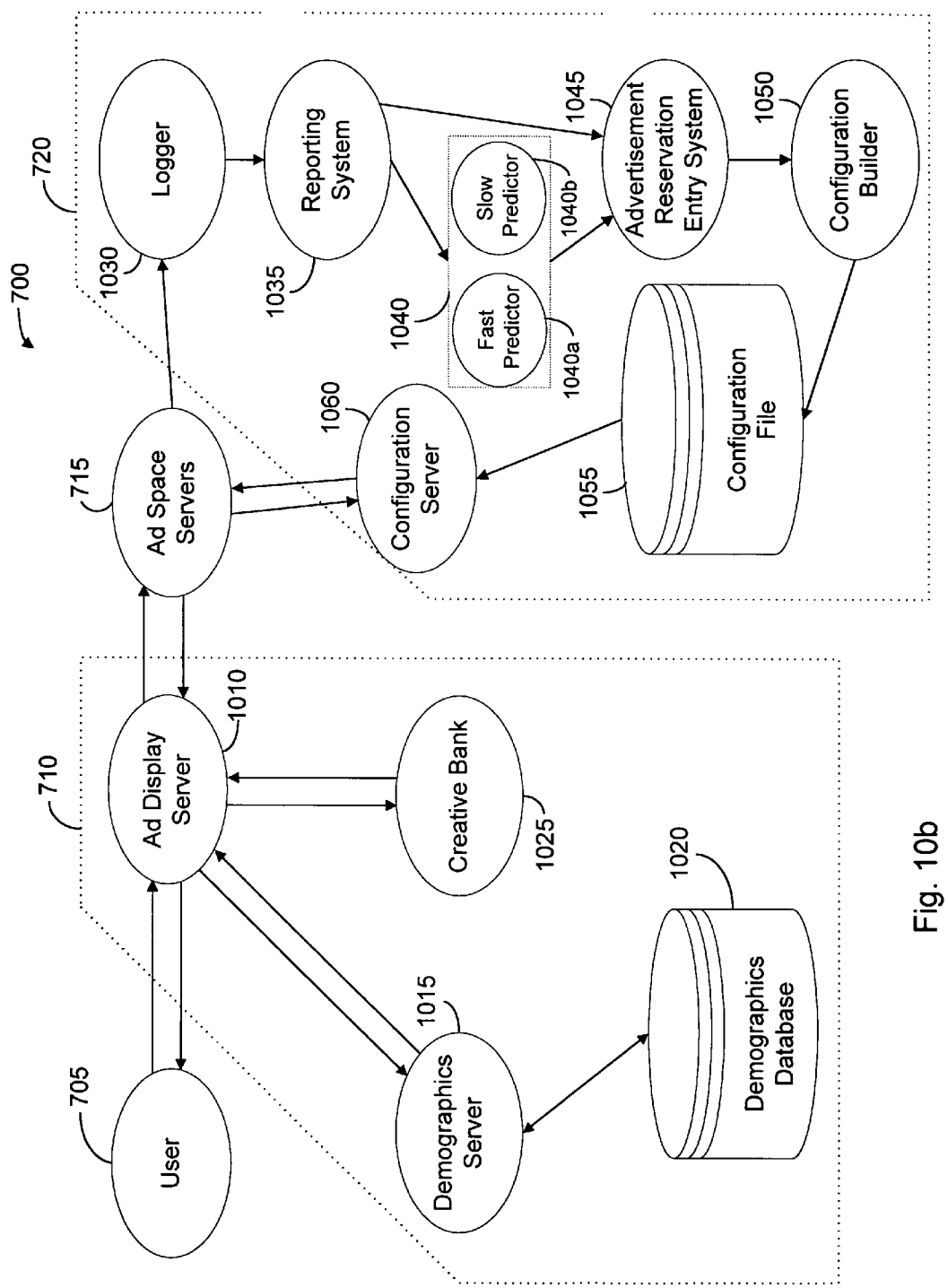
FIG. 10*b* is a block diagram providing a more detailed illustration of the components and relative orientation of the advertisement delivery system of FIG. 7, according to a second preferred implementation.

In one particular implementation shown in FIG. 10b, both a fast predictor 1040a and a slow predictor 1040b may use the same or different algorithms and the same or differing amounts of input data to generate outputs to be used by the advertisement reservation entry system 1045 for its use in selling future advertisement reservations for each ad space. For example, the fast predictor 1040a may use an algorithm that takes into account the numbers of advertisements displayed to users 705 on ad spaces during the most recent fourteen day period. The slow predictor 1040b may, for example, use 3 months of detailed historical data including demographic information, along with years of summarized historical data to account for seasonality and different traffic patterns, e.g., different traffic patterns on different days of the week. The slow predictor 1040b may use advanced techniques such as statistics, time series analysis, neural networks, optimization, clustering, pattern recognition, machine learning, and/or data mining to enhance the accuracy of its output. In addition either the fast or slow predictor 1040a, 1040b may use a varying sample size of the usage information in order to simulate ad serving over a hypothetical period of time. The outputs generated by both the fast predictor 1040a and the slow predictor 1040b help forecast the availability of advertising inventory for all ad spaces, so as to increase both advertising sales and client (advertiser) satisfaction.

Figure 11A:
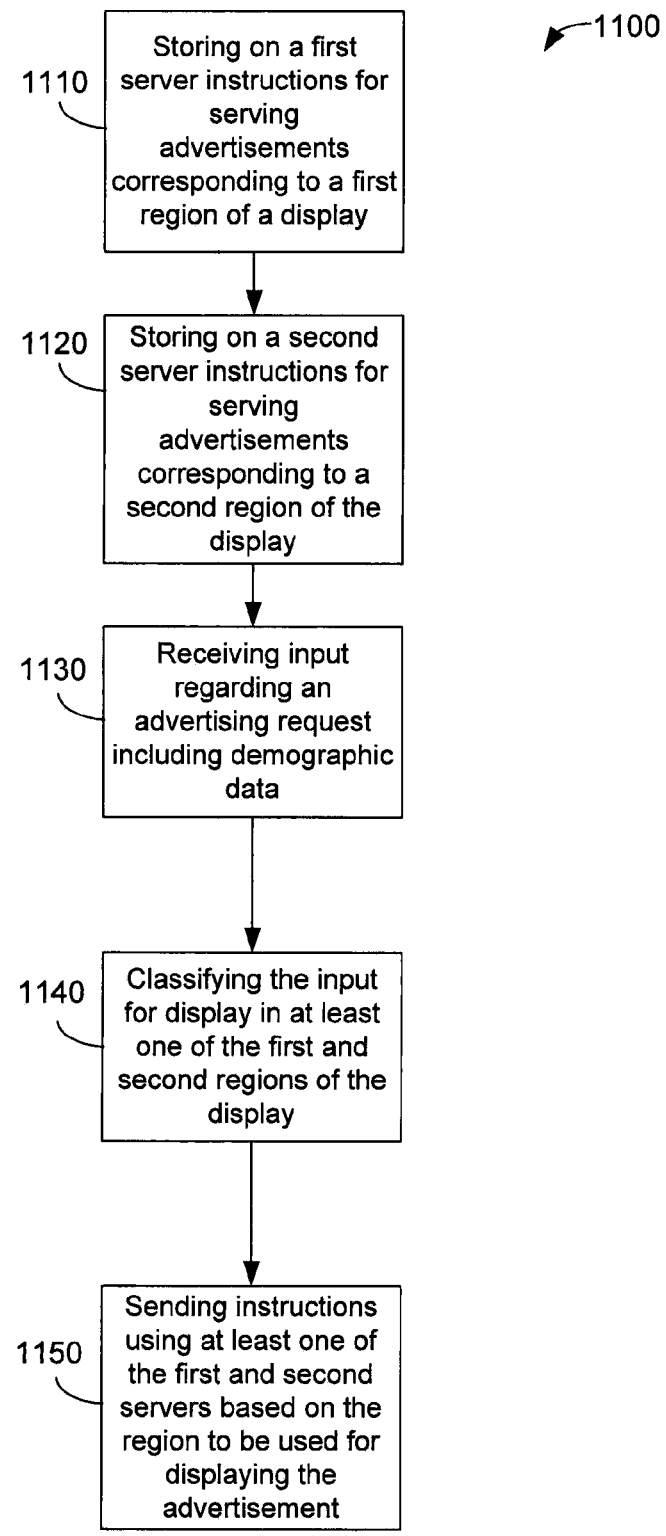
FIG. 11a is a flowchart of a process for delivering advertisements.

Referring to FIG. 11a, advertisements may be delivered according to exemplary process 1100. Process 1100 includes storing on a first ad space server 815a instructions for serving advertisements corresponding to a first region of a display (step 1110) and storing on a second ad space server 815b instructions for serving advertisements corresponding to a second region of the display that differs from the first region (step 1120). Information including demographic data may be received at the first ad space server 815a and the second ad space server 815b regarding an advertising request regarding an ad space served by its appropriate ad space server (step 1130), which information is used to determine which advertisements for display in the appropriate first and second regions of the display (step 1140). Instructions are sent to an ad display server 1010 by at least one of the first and second ad space servers 815a and 815b based on the region to be used for displaying an advertisement (step 1150).

Figure 11B:
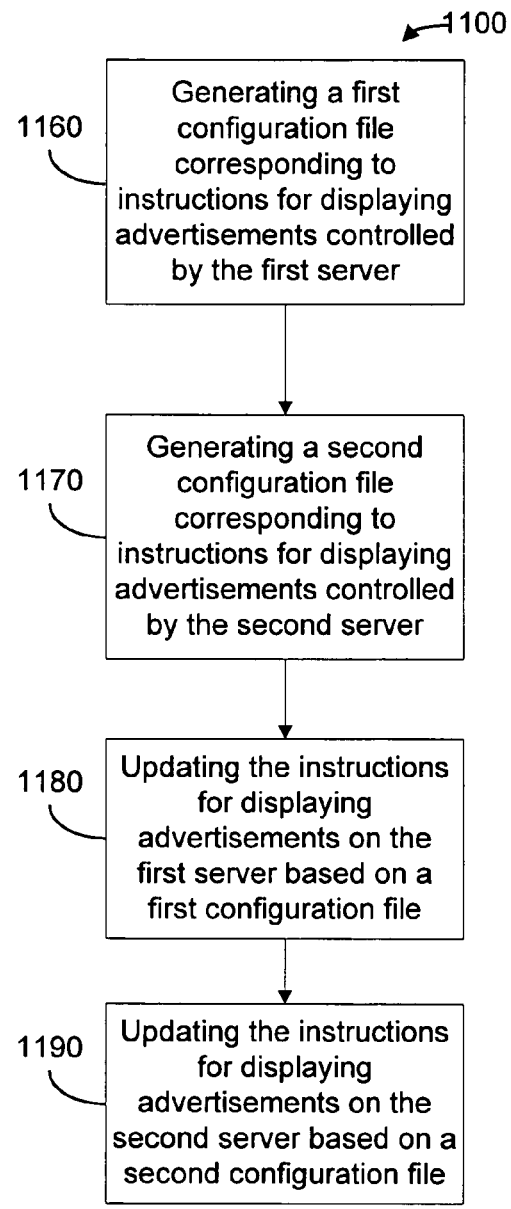
FIG. 11b is a flowchart of a process for generating configuration files.
Figure 12:
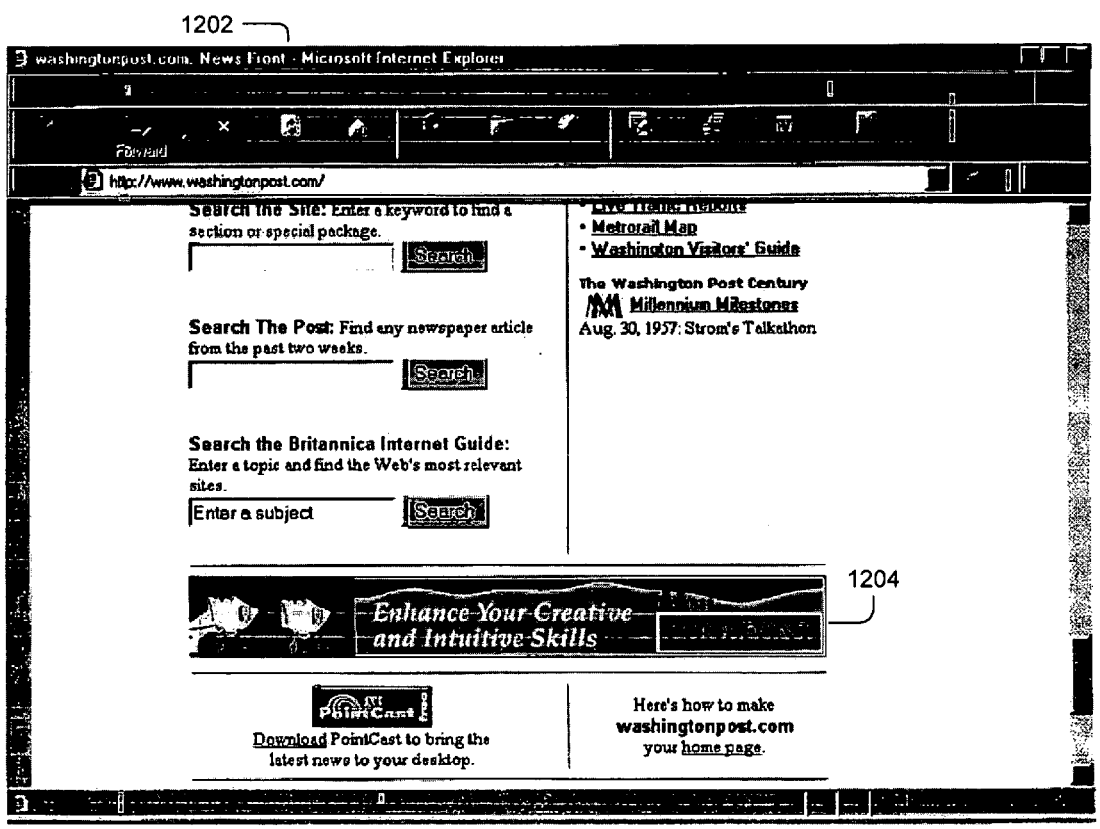
FIG. 12 is a screen shot of an online advertisement.

Referring to FIG. 11b, a configuration server 1060 generates a first configuration file corresponding to instructions for displaying advertisements controlled by the first ad space server 815a (step 1160) and/or a second configuration file corresponding to the instructions for serving advertisements controlled by the second ad space server 815b (step 1170). The instructions stored on the first ad space server 815a are then updated with the first configuration file (step 1180), and/or the instructions stored on the second ad space server 815b are then updated with the second configuration file (step 1190).

In one implementation, the process 1100 of FIGS. 11a and 11b includes delivering advertisements to a user 705 of an online system. For example, at step 1110, instructions for serving advertisements to a first ad space may be stored on a first ad space server 815a. At step 1120, instructions for serving advertisements to a second ad space that differ from the instructions for the first ad space may be stored on a second ad space server 815b. At step 1130, the first ad space server 815a may receive an advertising request corresponding to a specific ad space for which it delivers advertisements, and the second ad space server 815b may receive an advertising request corresponding to a specific ad space for which it delivers advertisements, wherein each request may also include demographic data regarding the user 705 of the online service. This demographic data may come directly from the user 705 or it may be received from another source, such as a demographics database 1020. At step 1140, the first and second ad space servers 815a, 815b classify the demographic data among the set of available advertisements. At step 1150, based on the classification of the data, the first and second ad space servers 815a, 815b send instructions to an ad display server 1010. The instructions generally instruct the ad display server 1010 as to which advertisement to display in a specific ad space for a particular user 705. At step 1160, a configuration system 720 generates a first configuration file that corresponds to instructions for serving advertisements to the first ad space. Similarly, at step 1170, the configuration system 720 generates a second configuration file that corresponds to instructions for serving advertisements to the second ad space. At step 1180, the instructions for the first ad space, residing on the first ad space server 815a, are updated with the first configuration file. Similarly, at step 1190, the instructions for the second ad space, residing on the second ad space server 815b, are updated with the second configuration file.

The systems, methods and techniques described here may be implemented in digital electronic circuitry, or in computer hardware, firmware, software, or in combinations of them. Apparatus embodying these techniques may include appropriate input and output devices, a computer processor, and a computer program product tangibly embodied in a machine-readable storage device for execution by a programmable processor. A process embodying these techniques may be performed by a programmable processor executing a program of instructions to perform desired functions by operating on input data and generating appropriate output. The techniques may advantageously be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

Other embodiments are within the scope of the following claims.

What is claimed is:

1. A targeted ad system comprising:

an ad display server system configured to receive an ad request for delivery of an ad to a web page display of a client-server system, receive targeting data associated with the ad request, determine whether the ad request is for delivery of an ad to at least a first ad space, from a first set of ad spaces, of the web page display, and determine whether the ad request is for delivery of an ad to at least a second ad space, from a second set of ad spaces, of the web page display, the second ad space of the web page display being different from the first ad space of the web page display;

an ad space server system including a first ad space server having a first ad space configuration file configured to identify a targeted ad from a plurality of available ads based on the targeting data associated with the ad request and provide instructions for delivering the targeted ad to the first ad space, a second ad space server having a second ad space configuration file configured to identify a targeted ad from a plurality of available ads based on the targeting data associated with the ad request and provide instructions for delivering the targeted ad to the second ad space of the web page display, the second ad space configuration file being different from the first ad space configuration file;

wherein the ad display server system is configured to direct the ad request and the targeting data received by the ad display server system to the first ad space server when the ad display server system determines that the ad request is for delivery of an ad to at least the first ad space of the web page display;

wherein the ad display server system is configured to direct the ad request and the targeting data received by the ad display server system to the second ad space server when the ad display server system determines that the ad request is for delivery of an ad to at least the second ad space of the web page display;

wherein the first ad space server is configured to receive first ad space update instructions for updating the first ad space configuration file based on ads delivered to the first ad space;

wherein the second ad space server is configured to receive second ad space update instructions for updating the second ad space configuration file based on ads delivered to the second ad space; and wherein delivery of ads is balanced between the first set of ad spaces and the second set of ad spaces, the first set of ad spaces (i) being visited more frequently than the second set of ad spaces and (ii) being smaller than the second set of ad spaces.

2. The system of claim 1, wherein the targeting data comprises demographic data.

3. The system of claim 1, wherein the targeting data comprises attributes, preferences, and historical information associated with a user, and the first ad space configuration file is configured to identify the targeted ad from the plurality of available ads based on the attributes, preferences, and historical information associated with the user.

4. The system of claim 1, wherein the targeting data comprises attributes, preferences, and historical information associated with a client, and the first ad space configuration file is configured to identify the targeted ad from the plurality of available ads based on the attributes, preferences, and historical information associated with the client.

5. The system of claim 1, wherein the targeting data comprises behavioral data associated with a user, and the first ad space configuration file is configured to identify the targeted ad from the plurality of available ads based on the behavior data associated with the user.

6. The system of claim 1, wherein the targeting data comprises behavioral data associated with a client, and the first ad space configuration file is configured to identify the targeted ad from the plurality of available ads based on the behavioral data associated with the client.

7. The system of claim 1, further comprising a configuration system configured to provide the first ad space update instructions to the first ad spacer server and to provide the second ad space update instructions to the second ad spacer server, the second ad space update instructions being different from the first ad space update instructions.

8. The system of claim 1, wherein the first ad space configuration file is configured to identify the targeted ad from the plurality of available ads based on first ad space historical data about ads delivered to the first ad space.

9. The system of claim 8, wherein the second ad space configuration file is configured to identify the targeted ad from the plurality of available ads based on second ad space historical data about ads delivered to the second ad space.

10. The system of claim 1, wherein the first ad space configuration file is configured to identify the targeted ad from the plurality of available ads based on a required number of first ad space impressions over a predetermined period of time associated with the first ad space.

11. The system of claim 10, wherein the second ad space configuration file is configured to identify the targeted ad from the plurality of available ads based on a required number of second ad space impressions over a predetermined period of time associated with the second ad space.

12. The system of claim 11, wherein the configuration system is configured to receive ad campaign data identifying the required number of first ad space impressions over a predetermined period of time associated with the first ad space.

13. The system of claim 12, wherein the configuration system is configured to receive ad campaign data identifying the required number of second ad space impressions over a predetermined period of time associated with the second ad space.

14. The system of claim 1, wherein the first ad space configuration file is configured to identify the targeted ad from the plurality of available ads based on a required number of clicks over a predetermined period of time associated with the first ad space.

15. The system of claim 14, wherein the configuration system is configured to receive ad campaign data identifying the required number of ad clicks over a predetermined period of time associated with the first and second ad spaces.

16. The system of claim 1, wherein the first ad space server is dedicated to serving ads on the first set of ad spaces and the second ad space server is dedicated to serving ads on the second set of ad spaces.

17. A system comprising:

an advertisement display server system that is configured to receive advertisement requests for ad spaces and that is configured to identify ad space servers assigned to select advertisements for the ad spaces associated with the received advertisement requests; and multiple, different ad space servers including at least a first ad space server and a second ad space server, the first ad space server, for a first set of ad spaces including a first ad space, being different than the advertisement display server system and the second ad space server, for a second set of ad spaces including a second ad space, being different than the advertisement display server system and the first ad space server, wherein the advertisement display server system is configured to:

receive a first advertisement request that includes a first identification number that uniquely identifies the first ad space integrated in a web page to which a user navigates to using a first address, the first advertisement request being sent in response to the user navigating to the web page using the first address and instances of the first ad space being integrated in a first set of multiple, different web pages;

in response to the first advertisement request, employ the first identification number to identify, from among the multiple, different ad space servers, the first ad space server as being assigned to select an advertisement for the first ad space identified by the first identification number;

in response to identifying the first ad space server, access first demographic data relevant to the first advertisement request and send the first demographic data to the first ad space server when requesting the first ad space server to select an advertisement for the first ad space;

receive a second advertisement request that includes a second identification number that uniquely identifies the second ad space integrated in the web page to which the user navigates to using the first address, the second advertisement request being sent in response to the user navigating to the web page using the first address and instances of the second ad space being integrated in a second set of multiple, different web pages; and in response to the second advertisement request, employ the second identification number to identify, from among the multiple, different ad space servers, the second ad space server as being assigned to select an advertisement for the second ad space identified by the second identification number; and in response to identifying the second ad space server, access second demographic data relevant to the second advertisement request and send the second demographic data to the second ad space server when requesting the second ad space server to select an advertisement for the second ad space wherein the first ad space server is configured to select an advertisement for the first ad space identified by the first identification number each time a request including the first identification number that uniquely identifies the first ad space is received by the advertisement display server system regardless of which of the first set of multiple, different web pages is associated with the request;

wherein the second ad space server is configured to select an advertisement for the second ad space identified by the second identification number each time a request including the second identification number that uniquely identifies the second ad space is received by the advertisement display server system regardless of which of the second set of multiple, different web pages is associated with the request;

wherein the advertisement display server system is further configured to:

deliver a first advertisement, selected by the first ad space server, for integration into the web page to which the user is requesting access; and deliver a second advertisement, selected by the second ad space server, for integration into the web page to which the user is requesting access, and wherein delivery of ads is balanced between the first set of ad spaces and the second set of ad spaces, the first set of ad spaces (i) being visited more frequently than the second set of ad spaces and (ii) being smaller than the second set of ad spaces.

18. The system of claim 17 wherein the advertisement display server system is configured to:

employ the first identification number to identify, from among the multiple, different ad space servers, the first ad space server as being assigned to select an advertisement for the first ad space identified by the first identification number by employing a hashing technique on the first identification number to identify, from among the multiple, different ad space servers, the first ad space server as being assigned to select an advertisement for the first ad space identified by the first identification number; and employ the second identification number to identify, from among the multiple, different ad space servers, the second ad space server as being assigned to select an advertisement for the second ad space identified by the second identification number by employing the hashing technique on the second identification number to identify, from among the multiple, different ad space servers, the second ad space server as being assigned to select an advertisement for the second ad space identified by the second identification number.

19. The system of claim 17 wherein the advertisement display server system is further configured to:

direct the first advertisement request to the first ad space server in response to identifying the first ad space server as being assigned to select an advertisement for the first ad space identified by the first identification number; and direct the second advertisement request to the second ad space server in response to identifying the second ad space server as being assigned to select an advertisement for the second ad space identified by the second identification number.

20. The system of claim 17 wherein:

the advertisement display server system is further configured to:

provide demographic data associated with the user to the first ad space server in response to identifying the first ad space server as being assigned to select an advertisement for the first ad space identified by the first identification number; and provide the demographic data associated with the user to the second ad space server in response to identifying the second ad space server as being assigned to select an advertisement for the second ad space identified by the second identification number;

the first ad space server is configured to select an advertisement for the first advertisement request based on the demographic data provided by the advertisement display server system; and the second ad space server is configured to select an advertisement for the second advertisement request based on the demographic data provided by the advertisement display server system.

21. The system of claim 17 wherein:

the first ad space server is configured to only select advertisements for the first ad space identified by the first identification number; and the second ad space server is configured to only select advertisements for the second ad space identified by the second identification number.

22. The system of claim 17 further comprising:

a logger configured to track and record advertisement activity including delivery of the first advertisement, selected by the first ad space server, for integration into the web page to which the user is requesting access and delivery of the second advertisement, selected by the second ad space server, for integration into the web page to which the user is requesting access.

23. The system of claim 22 wherein:

the logger is configured to track and record each time an impression is displayed to a user for each ad space and each time a user responds to an advertisement.

24. The system of claim 22 further comprising:

a reporting system configured to receive advertisement activity data from the logger, compare the received advertisement activity data with previously received historical data, and derive statistics based on the comparison.

25. The system of claim 24 wherein:

the reporting system is configured to generate reports that summarize the advertisement activity data received from the logger.

26. The system of claim 24 further comprising:

a predictor server configured to receive statistics data derived by the reporting system and use the received statistics data to forecast future ad space availability.

27. The system of claim 26 wherein the predictor server is configured to use the received statistics data to forecast future ad space availability by determining an average number of impressions served by each ad space over a number of days and predicting a number of impressions that will be served for a day based on the determined average number of impressions.

28. The system of claim 26 further comprising:
an advertisement reservation entry system configured to receive statistics data derived by the reporting system, receive forecast data from the predictor server, and take reservations and sell impressions for each ad space based on the statistics data derived by the reporting system and the forecast data received from the predictor server.

29. The system of claim 28 further comprising:
a configuration builder configured to receive information from the advertisement reservation entry system, generate configuration files that define frequency and identity of advertisements to be made available to specified ad spaces over a given time period based on the information received from the advertisement reservation entry system, and store the generated configuration files in electronic storage.

30. The system of claim 29 further comprising:
a configuration server configured to send each of the configuration files generated by the configuration builder to the corresponding ad space server, including sending a first configuration file to the first ad space server and sending a second configuration file to the second ad space server,
wherein the first ad space server is configured to select an advertisement for the first ad space identified by the first identification number using the first configuration file, and
wherein the second ad space server is configured to select an advertisement for the second ad space identified by the second identification number using the second configuration file.

31. The system of claim 30 wherein:
the predictor server includes a fast predictor configured to receive statistics data derived by the reporting system and use the received statistics data to forecast future ad space availability based on a first set of statistics data and a slow predictor configured to receive statistics data derived by the reporting system and use the received statistics data to forecast future ad space availability based on a second set of statistics data, the first set of statistics data being derived over a shorter time period than the second set of statistics; and
the advertisement reservation entry system is configured to receive statistics data derived by the reporting system, receive first forecast data from the fast predictor, receive second forecast data from the slow predictor, and take reservations and sell impressions for each ad space based on the statistics data derived by the reporting system, the first forecast data received from the fast predictor, and the second forecast data received from the slow predictor.

32. A method of controlling advertisements comprising:
receiving, by an advertisement display server system, a first advertisement request that includes a first identification number that uniquely identifies a first ad space, from a first set of ad spaces, integrated in a web page to which a user navigates to using a first address, the first advertisement request being sent in response to the user navigating to the web page using the first address and instances of the first ad space being integrated in a first set of multiple, different web pages;
in response to the first advertisement request, employing, by the advertisement display server system, the first identification number to identify, from among multiple, different ad space servers, a first ad space server that is assigned to select an advertisement for the first ad space identified by the first identification number and that is different than the advertisement display server system, the first ad space server being configured to select an advertisement for the first ad space identified by the first identification number each time a request including the first identification number that uniquely identifies the first ad space is received by the advertisement display server system regardless of which of the first set of multiple, different web pages is associated with the request;
in response to identifying the first ad space server, accessing, by the advertisement display server system, first demographic data relevant to the first advertisement request and sending the first demographic data to the first ad space server when requesting the first ad space server to select an advertisement for the first ad space;
receiving, by the advertisement display server system, a second advertisement request that includes a second identification number that uniquely identifies a second ad space, from a second set of ad spaces, integrated in the web page to which the user navigates to using the first address, the second advertisement request being sent in response to the user navigating to the web page using the first address and instances of the second ad space being integrated in a second set of multiple, different web pages;
in response to the second advertisement request, employing, by the advertisement display server system, the second identification number to identify, from among the multiple, different ad space servers, a second ad space server that is assigned to select an advertisement for the second ad space identified by the second identification number and that is different than the advertisement display server system and the first ad space server, the second ad space server being configured to select an advertisement for the second ad space identified by the second identification number each time a request including the second identification number that uniquely identifies the second ad space is received by the advertisement display server system regardless of which of the second set of multiple, different web pages is associated with the request;
in response to identifying the second ad space server, accessing, by the advertisement display server system, second demographic data relevant to the second advertisement request and sending the second demographic data to the second ad space server when requesting the second ad space server to select an advertisement for the second ad space;
using the first ad space server to select a first advertisement for the first ad space integrated in the web page to which the user is requesting access;
using the second ad space server to select a second advertisement for the second ad space integrated in the web page to which the user is requesting access;
delivering the first advertisement for integration into the web page to which the user is requesting access;
delivering the second advertisement for integration into the web page to which the user is requesting access; and
balancing delivery of ads between the first set of ad spaces and the second set of ad spaces, the first set of ad spaces (i) being visited more frequently than the second set of ad spaces and (ii) being smaller than the second set of ad spaces.

33. The method of claim 32 wherein:
employing the first identification number to identify, from among the multiple, different ad space servers, the first ad space server as being assigned to select an advertisement for the first ad space identified by the first identification number comprises employing a hashing technique on the first identification number to identify, from among the multiple, different ad space servers, the first ad space server as being assigned to select an advertisement for the first ad space identified by the first identification number; and
employing the second identification number to identify, from among the multiple, different ad space servers, the second ad space server as being assigned to select an advertisement for the second ad space identified by the second identification number comprises employing the hashing technique on the second identification number to identify, from among the multiple, different ad space servers, the second ad space server as being assigned to select an advertisement for the second ad space identified by the second identification number.

34. The method of claim 32 further comprising:
directing, by the advertisement display server system, the first advertisement request to the first ad space server in response to identifying the first ad space server as being assigned to select an advertisement for the first ad space identified by the first identification number; and
directing, by the advertisement display server system, the second advertisement request to the second ad space server in response to identifying the second ad space server as being assigned to select an advertisement for the second ad space identified by the second identification number.

35. The method of claim 32 further comprising:
providing, by the advertisement display server system, demographic data associated with the user to the first ad space server in response to identifying the first ad space server as being assigned to select an advertisement for the first ad space identified by the first identification number; and
providing, by the advertisement display server system, the demographic data associated with the user to the second ad space server in response to identifying the second ad space server as being assigned to select an advertisement for the second ad space identified by the second identification number,
wherein using the first ad space server to select a first advertisement for the first ad space integrated in the web page to which the user is requesting access comprises using the first ad space server to select an advertisement for the first advertisement request based on the demographic data provided by the advertisement display server system; and
wherein using the second ad space server to select a second advertisement for the second ad space integrated in the web page to which the user is requesting access comprises using the second ad space server to select an advertisement for the second advertisement request based on the demographic data provided by the advertisement display server system.

36. The method of claim 32 wherein:
the first ad space server is configured to only select advertisements for the first ad space identified by the first identification number; and
the second ad space server is configured to only select advertisements for the second ad space identified by the second identification number.

37. The method of claim 32 wherein:
the first ad space server is configured to select advertisements for a smaller number of ad spaces than the second ad space server.

38. The method of claim 32 further comprising:
tracking and recording, by a logger, advertisement activity including delivery of the first advertisement, selected by the first ad space server, for integration into the web page to which the user is requesting access and delivery of the second advertisement, selected by the second ad space server, for integration into the web page to which the user is requesting access.

39. The method of claim 38 wherein:
tracking and recording, by the logger, advertisement activity comprises tracking and recording, by the logger, each time an impression is displayed to a user for each ad space and each time a user responds to an advertisement.

40. The method of claim 38 further comprising:
receiving, by a reporting system, advertisement activity data from the logger;
comparing, by the reporting system, the received advertisement activity data with previously received historical data; and
deriving, by the reporting system, statistics based on the comparison.

41. The method of claim 40 further comprising:
generating, by the reporting system, reports that summarize the advertisement activity data received from the logger.

42. The method of claim 40 further comprising:
receiving, by a predictor server, statistics data derived by the reporting system; and
using, by the predictor server, the received statistics data to forecast future ad space availability.

43. The method of claim 42 wherein using, by the predictor server, the received statistics data to forecast future ad space availability comprises determining, by the predictor server, an average number of impressions served by each ad space over a number of days and predicting, by the predictor server, a number of impressions that will be served for a day based on the determined average number of impressions.

44. The method of claim 42 further comprising:
receiving, by an advertisement reservation entry system, statistics data derived by the reporting system;
receiving, by the advertisement reservation entry system, forecast data from the predictor server; and
taking reservations and selling impressions, by the advertisement reservation entry system, for each ad space based on the statistics data derived by the reporting system and the forecast data received from the predictor server.

45. The method of claim 44 further comprising:
receiving, by a configuration builder, information from the advertisement reservation entry system;
generating, by the configuration builder, configuration files that define frequency and identity of advertisements to be made available to specified ad spaces over a given time period based on the information received from the advertisement reservation entry system, and
storing, by the configuration builder, the generated configuration files in electronic storage.

46. The method of claim 45 further comprising:
sending, by a configuration server, each of the configuration files generated by the configuration builder to the corresponding ad space server, including sending a first configuration file to the first ad space server and sending a second configuration file to the second ad space server, wherein using the first ad space server to select a first advertisement for the first ad space integrated in the web page to which the user is requesting access comprises using the first ad space server to select a first advertisement for the first ad space integrated in the web page to which the user is requesting access based on the first configuration file; and wherein using the second ad space server to select a second advertisement for the second ad space integrated in the web page to which the user is requesting access comprises using the second ad space server to select a second advertisement for the second ad space integrated in the web page to which the user is requesting access based on the second configuration file.

47. The method of claim 46 wherein:

using, by the predictor server, the received statistics data to forecast future ad space availability comprises:

using, by a fast predictor, the received statistics data to forecast future ad space availability based on a first set of statistics data, and using, by a slow predictor, the received statistics data to forecast future ad space availability based on a second set of statistics data, the first set of statistics data being derived in a shorter time period than the second set of statistics data; and taking reservations and selling impressions, by the advertisement reservation entry system, for each ad space based on the statistics data derived by the reporting system and the forecast data received from the predictor server comprises taking reservations and selling impressions, by the advertisement reservation entry system, for each ad space based on the statistics data derived by the reporting system, first forecast data received from the fast predictor, and second forecast data received from the slow predictor.

48. At least one non-transitory computer storage medium storing instructions that, when executed by one or more processing devices, cause the one or more processing devices to perform operations comprising:

receiving, by an advertisement display server system, a first advertisement request that includes a first identification number that uniquely identifies a first ad space, from a first set of ad spaces, integrated in a web page to which a user navigates to using a first address, the first advertisement request being sent in response to the user navigating to the web page using the first address and instances of the first ad space being integrated in a first set of multiple, different web pages;

in response to the first advertisement request, employing, by the advertisement display server system, the first identification number to identify, from among multiple, different ad space servers, a first ad space server that is assigned to select an advertisement for the first ad space identified by the first identification number and that is different than the advertisement display server system, the first ad space server being configured to select an advertisement for the first ad space identified by the first identification number each time a request including the first identification number that uniquely identifies the first ad space is received by the advertisement display server system regardless of which of the first set of multiple, different web pages is associated with the request;

in response to identifying the first ad space server, accessing, by the advertisement display server system, first demographic data relevant to the first advertisement request and sending the first demographic data to the first ad space server when requesting the first ad space server to select an advertisement for the first ad space;

receiving, by the advertisement display server system, a second advertisement request that includes a second identification number that uniquely identifies a second ad space, from a second set of ad spaces, integrated in the web page to which the user navigates to using the first address, the second advertisement request being sent in response to the user navigating to the web page using the first address and instances of the second ad space being integrated in a second set of multiple, different web pages;

in response to the second advertisement request, employing, by the advertisement display server system, the second identification number to identify, from among the multiple, different ad space servers, a second ad space server that is assigned to select an advertisement for the second ad space identified by the second identification number and that is different than the advertisement display server system and the first ad space server, the second ad space server being configured to select an advertisement for the second ad space identified by the second identification number each time a request including the second identification number that uniquely identifies the second ad space is received by the advertisement display server system regardless of which of the second set of multiple, different web pages is associated with the request;

in response to identifying the second ad space server, accessing, by the advertisement display server system, second demographic data relevant to the second advertisement request and sending the second demographic data to the second ad space server when requesting the second ad space server to select an advertisement for the second ad space;

using the first ad space server to select a first advertisement for the first ad space integrated in the web page to which the user is requesting access;

using the second ad space server to select a second advertisement for the second ad space integrated in the web page to which the user is requesting access;

delivering the first advertisement for integration into the web page to which the user is requesting access;

delivering the second advertisement for integration into the web page to which the user is requesting access; and balancing delivery of ads between the first set of ad spaces and the second set of ad spaces, the first set of ad spaces (i) being visited more frequently than the second set of ad spaces and (ii) being smaller than the second set of ad spaces.

49. A targeted ad system comprising:

an ad display server system configured to receive an ad request for delivery of an ad to a web page display of a client-server system, receive behavioral data about a client, determine whether the ad request is for delivery of an ad to at least a first ad space of the web page display, and determine whether the ad request is for delivery of an ad to at least a second ad space of the web page display, the second ad space of the web page display being different from the first ad space of the web page display;

an ad space server system including a first ad space server having a first ad space configuration file configured to identify a targeted ad from a plurality of available ads based on the behavioral data and provide instructions for delivering the targeted ad to the first ad space, a second ad space server having a second ad space configuration file configured to identify a targeted ad from a plurality of available ads based on the behavioral data and provide instructions for delivering the targeted ad to the second ad space of the web page display, the second ad space configuration file being different from the first ad space configuration file;

wherein the ad display server system is configured to direct the ad request and the behavioral data received by the ad display server system to the first ad space server when the ad display server system determines that the ad request is for delivery of an ad to at least the first ad space of the web page display;

wherein the ad display server system is configured to direct the ad request and the behavioral data received by the ad display server system to the second ad space server when the ad display server system determines that the ad request is for delivery of an ad to at least the second ad space of the web page display;

wherein the first ad space server is configured to receive first ad space update instructions for updating the first ad space configuration file based on ads delivered to the first ad space;

wherein the second ad space server is configured to receive second ad space update instructions for updating the second ad space configuration file based on ads delivered to the second ad space;

a configuration system configured to provide the first ad space update instructions to the first ad spacer server and to provide the second ad space update instructions to the second ad spacer server, the second ad space update instructions being different from the first ad space update instructions;

wherein the first ad space configuration file is configured to identify the targeted ad from the plurality of available ads based on historical data about ads delivered to the first ad space and based on a required number of ad impressions over a predetermined period of time associated with the first ad space; and wherein the ad space server system is configured to balance delivery of ads between a first set of ad spaces that includes the first ad space and a second set of ad spaces that includes the second ad space, the second set of ad spaces (i) comprising more ad spaces than the first set of ad spaces and (ii) being visited less frequently than the first set of ad spaces.

50. The system of claim 49, wherein the first ad space configuration file is configured to identify the targeted ad from the plurality of available ads based on a required number of clicks over a predetermined period of time for the first ad space.

51. The system of claim 50, wherein the configuration system is configured to receive ad campaign data identifying the required number of ad clicks over a predetermined period of time for the first ad space.

52. The system of claim 49, wherein the first ad space server is dedicated to serving ads on the first set of ad spaces and the second ad space server is dedicated to serving ads on the second set of ad spaces.

53. The system of claim 52, wherein the first ad space is in the first set of ad spaces and the second ad space is in the second set of ad spaces.

54. A computer-implemented method for delivering ads in a client-server system comprising:

receiving an ad request for delivery of an ad to a web page display of a client-server system;

receiving targeting data associated with the ad request;

determining, by one or more processors, whether the ad request is for delivery of an ad to at least a first ad space of the web page display;

determining, by the one or more processors, whether the ad request is for delivery of an ad to at least a second ad space of the web page display, the second ad space of the web page display being different from the first ad space of the web page display;

identifying a first ad space targeted ad from a plurality of available ads based on the targeting data associated with the ad request;

providing first ad space instructions for delivering the first ad space targeted ad to the first ad space;

identifying a second ad space targeted ad from a plurality of available ads based on the targeting data associated with the ad request;

providing second ad space instructions for delivering the second ad space targeted ad to the second ad space of the web page display, the second ad space instructions being different from the first ad space instructions;

directing the ad request and the targeting data to a first ad space server when the ad request is determined to be for delivery of an ad to at least the first ad space of the web page display;

directing the ad request and the targeting data to a second ad space server when the ad request is determined to be for delivery of an ad to at least the second ad space of the web page display;

transmitting first ad space update instructions to the first ad space server to update the first ad space instructions based on ads delivered to the first ad space; and transmitting second ad space update instructions to the second ad space server to update the second ad space instructions based on ads delivered to the second ad space; and balancing, by the one or more processors, delivery of ads between a first set of ad spaces that includes the first as space and a second set of ad spaces that includes the second ad space, the first set of ad spaces (i) being visited more frequently than the second set of ad spaces and (ii) being smaller than the second set of ad spaces.

55. The method of claim 54, wherein the targeting data comprises demographic data.

56. The method of claim 54, wherein the targeting data comprises attributes, preferences, and historical information associated with a user.

57. The method of claim 54, wherein the targeting data comprises attributes, preferences, and historical information associated with a client.

58. The method of claim 54, wherein the targeting data comprises behavioral data associated with a user.

59. The method of claim 54, wherein the targeting data comprises historical data about ads delivered to the first ad space.

60. The method of claim 59, wherein the targeting data comprises historical data about ads delivered to the second ad space.

61. The method of claim 54, wherein identifying the first ad space targeted ad from the plurality of available ads is based on a required number of first ad space impressions over a predetermined period of time associated with the first ad space.

62. The method of claim 54, wherein identifying the second ad space targeted ad from the plurality of available ads is based on a required number of second ad space impressions over a predetermined period of time associated with the second ad space.

63. The method of claim 61, further comprising receiving ad campaign data identifying the required number of first ad space impressions over a predetermined period of time associated with the first ad space.

64. The method of claim 62, further comprising receiving ad campaign data identifying the required number of second ad space impressions over a predetermined period of time associated with the second ad space.

65. The method of claim 54, wherein identifying the first ad space targeted ad from the plurality of available ads is based on a required number of clicks over a predetermined period of time associated with the first ad space.

66. The method of claim 54, wherein identifying the second ad space targeted ad from the plurality of available ads is based on a required number of clicks over a predetermined period of time associated with the second ad space.

67. The method of claim 54, further comprising dedicating the first ad space server to serving ads on the first set of ad spaces and dedicating the second ad space server to serving ads on the second set of ad spaces.

68. A method for delivery targeted ads in a ad network of a client-server system comprising:
receiving an ad request for delivery of an ad to a web page display of an ad network in a client-server system;
receiving behavioral data about a client;
determining, by one or more processors, whether the ad request is for delivery of an ad to at least a first ad space of the web page display;
determining, by one or more processors, whether the ad request is for delivery of an ad to at least a second ad space of the web page display, the second ad space being different from the first ad space;
identifying a first ad space targeted ad from a plurality of available ads based on the behavioral data;
transmitting first ad space instructions to a first ad space server for delivering the first ad space targeted ad to the first ad space;
identifying a second ad space targeted ad from a plurality of available ads based on the behavioral data;
transmitting second ad space instructions to a second ad space server for delivering the second ad space targeted ad to the second ad space, the second ad space instructions being different from the first ad space instructions and the first ad space server being different from the second ad space server;
directing the ad request and the behavioral data to the first ad space server when the ad request is determined to be for delivery of an ad to the first ad space;
directing the ad request and the behavioral data to the second ad space server when the ad request is determined to be for delivery of an ad to the second ad space;
transmitting first ad space update instructions to the first ad space server based on first ad space historical data about ads delivered to the first ad space and based on a required number of first ad space impressions over a predetermined period of time associated with the first ad space;
transmitting second ad space update instructions to the second ad space server based on second ad space historical data about ad delivered to the second ad space and based on a required number of second ad space impressions over a predetermined period of time associated with the second ad space, the second ad space historical data being different from the second ad space historical data;
balancing, by the one or more processors, delivery of ads between a first set of ad spaces that includes the first ad space and a second set of ad spaces that includes the second ad space, the first set (i) being smaller than the second ad space and (ii) being visited more frequently than the second ad space; and
wherein the first ad space is in the first set of ad spaces and the second ad space is in the second set of ad spaces.

69. The method of claim 68, wherein identifying the first ad space targeted ad from a plurality of available ads is based on a required number of clicks over a predetermined period of time for the first ad space, and further comprising receiving ad campaign data identifying the required number of ad clicks over the predetermined period of time for the first ad space.

70. The method of claim 68, wherein identifying the second ad space targeted ad from a plurality of available ads is based on a required number of clicks over a predetermined period of time for the second ad space, and further comprising receiving ad campaign data identifying the required number of ad clicks over the predetermined period of time for the second ad space.

71. The method of claim 68, further comprising dedicating the first ad space server to serving ads on the first set of ad spaces and dedicating the second ad space to serving ads on the second set of ad spaces.

* * * * *